(12) United States Patent
Wada et al.

(10) Patent No.: US 10,977,082 B2
(45) Date of Patent: Apr. 13, 2021

(54) RESOURCE ALLOCATION OPTIMIZATION SUPPORT SYSTEM AND RESOURCE ALLOCATION OPTIMIZATION SUPPORT METHOD

(71) Applicant: Hitachi, Ltd., Tokyo (JP)

(72) Inventors: Kiyomi Wada, Tokyo (JP); Shinichi Hayashi, Tokyo (JP); Tomohiro Morimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 83 days.

(21) Appl. No.: 16/354,649

(22) Filed: Mar. 15, 2019

(65) Prior Publication Data

US 2020/0081740 A1    Mar. 12, 2020

(30) Foreign Application Priority Data

Sep. 12, 2018  (JP) ................. 2018-170837

(51) Int. Cl.
  *G06F 9/50*  (2006.01)
(52) U.S. Cl.
  CPC ................. *G06F 9/5016* (2013.01)
(58) Field of Classification Search
  CPC ....... G06F 2209/501; G06F 2209/5014; G06F 9/50; G06F 2209/5011; G06F 9/5016
  See application file for complete search history.

(56) References Cited

U.S. PATENT DOCUMENTS

| | | | |
|---|---|---|---|
| 9,495,222 B1 | 11/2016 | Jackson | |
| 2003/0097393 A1* | 5/2003 | Kawamoto | G06F 9/5083 718/1 |
| 2007/0162584 A1* | 7/2007 | Kokusho | G06F 9/5083 709/223 |
| 2007/0233996 A1* | 10/2007 | Sasaki | G06F 9/5061 711/170 |
| 2008/0077928 A1* | 3/2008 | Matsuzaki | G06F 9/5044 718/104 |

(Continued)

FOREIGN PATENT DOCUMENTS

| | | |
|---|---|---|
| WO | 2012169027 A1 | 12/2012 |
| WO | 2016/145091 A1 | 9/2016 |

OTHER PUBLICATIONS

Japanese Office Action received in corresponding Application No. 2018-170837 dated Jul. 7, 2020.

*Primary Examiner* — Tuan C Dao

(74) *Attorney, Agent, or Firm* — Mattingly & Malur, PC

(57) ABSTRACT

A resource allocation system calculates a performance ratio and a cost for each of a plurality of service tiers. For each of the service tiers, the performance ratio is a ratio of the intended performance to an agreement performance, the agreement performance is a performance that serves as a reference performance of the service tier, the intended performance is a performance calculated for the service tier, and the cost is based on a used capacity of an allocated storage resource among the storage resources belonging to the service tier. The system displays a service tier map that has an axis corresponding to the performance ratio and a second axis orthogonal to the axis and corresponding to the cost. A display object is placed, for each service tier, at a position according to the calculated performance ratio and the calculated cost of the service tier on the service tier map.

15 Claims, 26 Drawing Sheets

(56) References Cited

U.S. PATENT DOCUMENTS

| | | | |
|---|---|---|---|
| 2008/0270515 A1* | 10/2008 | Chen | H04L 67/16 709/202 |
| 2011/0307901 A1* | 12/2011 | Blanding | G06F 9/5061 718/104 |
| 2013/0275396 A1* | 10/2013 | Condict | H03M 7/607 707/693 |
| 2014/0215487 A1* | 7/2014 | Cherkasova | G06F 9/5083 718/106 |

* cited by examiner

FIG. 11

Input Hive Tables 222

| 1101 ~ | APPLDEV ASSOCIATION TABLE |
|---|---|
| 1111 ~ | APPLICATION NAME |
| 1112 ~ | LDEV NAME |
| 1113 ~ | STORAGE NAME |
| 1114 ~ | COUNTRY NAME |
| 1115 ~ | CITY NAME |
| 1116 ~ | DATA CENTER NAME |

| 1102 ~ | POOL CONFIGURATION TABLE |
|---|---|
| 1121 ~ | POOL NAME |
| 1122 ~ | SERVICE TIER NAME |
| 1123 ~ | LDEV NAME |
| 1124 ~ | STORAGE NAME |
| 1125 ~ | COUNTRY NAME |
| 1126 ~ | CITY NAME |
| 1127 ~ | DATA CENTER NAME |

| 1103 ~ | SERVICE TIER CONFIGURATION TABLE |
|---|---|
| 1131 ~ | SERVICE TIER NAME |
| 1132 ~ | AGREEMENT IOPS |
| 1133 ~ | APPROPRIATE MINIMUM USAGE RATE |
| 1134 ~ | APPROPRIATE MAXIMUM USAGE RATE |
| 1135 ~ | APPROPRIATE MINIMUM IOPS |
| 1136 ~ | APPROPRIATE MAXIMUM IOPS |
| 1137 ~ | UNIT PRICE |

| 1104 ~ | LDEV CONFIGURATION TABLE |
|---|---|
| 1141 ~ | LDEV NAME |
| 1142 ~ | ALLOCATED CAPACITY |
| 1143 ~ | USED CAPACITY |

| 1105 ~ | LDEV PERFORMANCE TABLE |
|---|---|
| 1151 ~ | DATE |
| 1152 ~ | LDEV NAME |
| 1153 ~ | IOPS |
| 1154 ~ | RESPONSE TIME |
| 1155 ~ | STORAGE NAME |
| 1156 ~ | COUNTRY NAME |
| 1157 ~ | CITY NAME |
| 1158 ~ | DATA CENTER NAME |

FIG. 12

Work Hive Tables 224

| | |
|---|---|
| 1201 | LEARNING MODEL TABLE |
| 1211 | LEARNING MODEL NAME |
| 1222 | APPLICATION NAME |
| 1223 | SERVICE TIER NAME |
| 1224 | STORAGE NAME |
| 1225 | COUNTRY NAME |
| 1226 | CITY NAME |
| 1227 | DATA CENTER NAME |
| 1218 | LEARNING START DATE |
| 1219 | LEARNING END DATE |
| 1220 | FUNCTION FORMULA |

FIG. 13A

Output Hive Tables 225

| 1301 | APPLICATION CONFIGURATION TABLE |
|---|---|
| 1311 | APPLICATION NAME |
| 1312 | SERVICE TIER NAME |
| 1313 | TOTAL CAPACITY |
| 1314 | TOTAL COST |
| 1315 | STORAGE NAME |
| 1316 | COUNTRY NAME |
| 1317 | CITY NAME |
| 1318 | DATA CENTER NAME |

| 1302 | APPLICATION ASSOCIATION TABLE |
|---|---|
| 1321 | POOL NAME |
| 1322 | SERVICE TIER NAME |
| 1323 | APPLICATION NAME |
| 1324 | LDEV NAME |
| 1325 | CAPACITY |
| 1326 | COST |
| 1327 | STORAGE NAME |
| 1328 | COUNTRY NAME |
| 1329 | CITY NAME |
| 1330 | DATA CENTER NAME |

| 1303 | MEASURED PERFORMANCE TABLE |
|---|---|
| 1331 | DATE |
| 1332 | APPLICATION NAME |
| 1333 | SERVICE TIER NAME |
| 1334 | Total IOPS |
| 1335 | STORAGE NAME |
| 1336 | COUNTRY NAME |
| 1337 | CITY NAME |
| 1338 | DATA CENTER NAME |

| 1304 | PREDICTED PERFORMANCE TABLE |
|---|---|
| 1341 | DATE |
| 1342 | APPLICATION NAME |
| 1343 | SERVICE TIER NAME |
| 1344 | Total IOPS |
| 1345 | STORAGE NAME |
| 1346 | COUNTRY NAME |
| 1347 | CITY NAME |
| 1348 | DATA CENTER NAME |

SERVICE TIER CONFIGURATION TABLE
1103

FIG. 13B

Output Hive Tables 225

1305 — MEASURED APPROPRIATE/INAPPROPRIATE JUDGEMENT TABLE

- 1351 — DATE
- 1352 — APPLICATION NAME
- 1353 — SERVICE TIER NAME
- 1354 — MAXIMUM MEASURED USAGE RATE
- 1355 — AVERAGE MEASURED USAGE RATE
- 1356 — APPROPRIATE/INAPPROPRIATE JUDGEMENT
- 1357 — STORAGE NAME
- 1358 — COUNTRY NAME
- 1359 — CITY NAME
- 1360 — DATA CENTER NAME

1306 — PREDICTED APPROPRIATE/INAPPROPRIATE JUDGEMENT TABLE

- 1361 — DATE
- 1362 — APPLICATION NAME
- 1363 — SERVICE TIER NAME
- 1364 — MAXIMUM PREDICTED USAGE RATE
- 1365 — AVERAGE PREDICTED USAGE RATE
- 1366 — APPROPRIATE/INAPPROPRIATE JUDGEMENT
- 1367 — STORAGE NAME
- 1368 — COUNTRY NAME
- 1369 — CITY NAME
- 1370 — DATA CENTER NAME

1307 — LDEV RE-TIERING TABLE

- 1371 — DATE
- 1372 — APPLICATION NAME
- 1373 — SERVICE TIER NAME
- 1374 — LDEV NAME
- 1375 — MAXIMUM IOPS
- 1376 — AVERAGE IOPS
- 1377 — MAXIMUM USAGE RATE
- 1378 — AVERAGE USAGE RATE
- 1379 — APPROPRIATE/INAPPROPRIATE JUDGEMENT
- 1380 — TYPE OF RE-TIERING
- 1381 — DESTINATION SERVICE TIER NAME
- 1382 — STORAGE NAME
- 1383 — COUNTRY NAME
- 1384 — CITY NAME
- 1385 — DATA CENTER NAME

FIG. 24

APPROPRIATE/INAPPROPRIATE JUDGEMENT DISPLAY TABLE (2401)

| Ref | Field |
|---|---|
| 2411 | DATE |
| 2412 | APPLICATION NAME |
| 2413 | SERVICE TIER NAME |
| 2414 | MAXIMUM USAGE RATE |
| 2415 | AVERAGE USAGE RATE |
| 2416 | APPROPRIATE/INAPPROPRIATE JUDGEMENT |
| 2417 | TOTAL CAPACITY |
| 2418 | TOTAL COST |
| 2419 | STORAGE NAME |
| 2420 | COUNTRY NAME |
| 2421 | CITY NAME |
| 2422 | DATA CENTER NAME |

PROPOSED CANDIDATE DISPLAY TABLE (2403)

| Ref | Field |
|---|---|
| 2431 | DATE |
| 2432 | APPLICATION NAME |
| 2433 | SERVICE TIER NAME |
| 2434 | LDEV NAME |
| 2435 | CAPACITY |
| 2436 | COST |
| 2437 | MAXIMUM IOPS |
| 2438 | AVERAGE IOPS |
| 2439 | MAXIMUM USAGE RATE |
| 2440 | AVERAGE USAGE RATE |
| 2441 | APPROPRIATE/INAPPROPRIATE JUDGEMENT |
| 2442 | RE-TIERING TYPE |
| 2443 | DESTINATION SERVICE TIER NAME |
| 2444 | IOPS AFTER RE-TIERING |
| 2445 | COST AFTER RE-TIERING |
| 2446 | COST DIFFERENCE |
| 2447 | STORAGE NAME |
| 2448 | COUNTRY NAME |
| 2449 | CITY NAME |
| 2450 | DATA CENTER NAME |

RESOURCE ALLOCATION OPTIMIZATION SUPPORT SYSTEM AND RESOURCE ALLOCATION OPTIMIZATION SUPPORT METHOD

CROSS-REFERENCE TO RELATED APPLICATION

The present application claims priority from Japanese application JP 2018-170837, filed on Sep. 12, 2018, the contents of which is hereby incorporated by reference into this application.

BACKGROUND OF THE INVENTION

1. Field of the Invention

The present invention generally relates to resource allocation optimization.

2. Description of the Related Art

As techniques related to resource allocation optimization, there is known a technique for optimizing resource placement, specifically, a technique disclosed in WO2016/145091.

Meanwhile, as one of storage services such as a cloud service, there is known a service that provides a plurality of service tiers which have different unit prices and appropriate performance ranges and to which a plurality of storage resources are classified to belong. A customer (an example of a user) selects one or more service tiers in response to a performance requirement (for example, latency or throughput) of an application (for example, one or more computer programs using one or more allocated storage resources). The one or plurality of storage resources classified to belong to the selected one or more service tiers are allocated to the application.

According to WO2016/145091, allocated amounts of resources are optimized in a distributed system.

However, it is necessary for the storage service described above to optimize resource performance allocation, specifically, to optimize performances of a plurality of service tiers associated with one or a plurality of applications as an alternative to or in addition to the optimization of the allocated amounts of resources. If the performance of at least one service tier is inappropriately high, there is a growing risk that the performance requirement of the application cannot be satisfied or that a performance failure of some sort occurs. On the other hand, if the performance of at least one service tier is inappropriately low, wasted cost is incurred.

A technique that enables determination as to whether the performances of the plurality of service tiers associated with the one or plurality of applications are appropriate is unknown.

SUMMARY OF THE INVENTION

A system that supports resource allocation optimization calculates a performance ratio and a cost for each of a plurality of service tiers associated with one or a plurality of applications on the basis of management data including data related to usage of a plurality of storage resources classified to belong to the plurality of service tiers. For each of the service tiers, the performance ratio is a ratio of an intended performance to an agreement performance, the agreement performance is a performance that serves as a reference performance of the service tier, the intended performance is a performance calculated for the service tier, and the cost is based on a used capacity of an allocated storage resource among the storage resources belonging to the service tier. The system displays a service tier map. The service tier map has a first axis corresponding to the performance ratio and a second axis orthogonal to the first axis and corresponding to the cost. A display object is placed, for each service tier, at a position according to the calculated performance ratio and the calculated cost of the service tier on the service tier map.

While the "performance" mentioned herein represents an IOPS in one embodiment described hereinafter, the other type of performance (typically, an I/O performance) such as response time may be adopted as the "performance" as an alternative to or in addition to the IOPS.

According to the present invention, for each of a plurality of service tiers associated with one or a plurality of applications, the intended performance of the service tier is normalized to the performance ratio on the basis of the agreement performance of the service tier, and the performance ratios and the costs of the plurality of service tiers are expressed on the same map. Checking the map enables a user to determine whether the intended performances of the plurality of service tiers are appropriate.

BRIEF DESCRIPTION OF THE DRAWINGS

FIG. 11 is a configuration diagram of Input Hive Tables;

FIG. 12 is a configuration diagram of Work Hive Tables;

FIG. 13A is a configuration diagram of a part of Output Hive Tables;

FIG. 13B is a configuration diagram of a remainder of the Output Hive Tables;

FIG. 24 is a configuration diagram of Output Tables for display in the GUI.

DESCRIPTION OF THE PREFERRED EMBODIMENT

Figure 1:
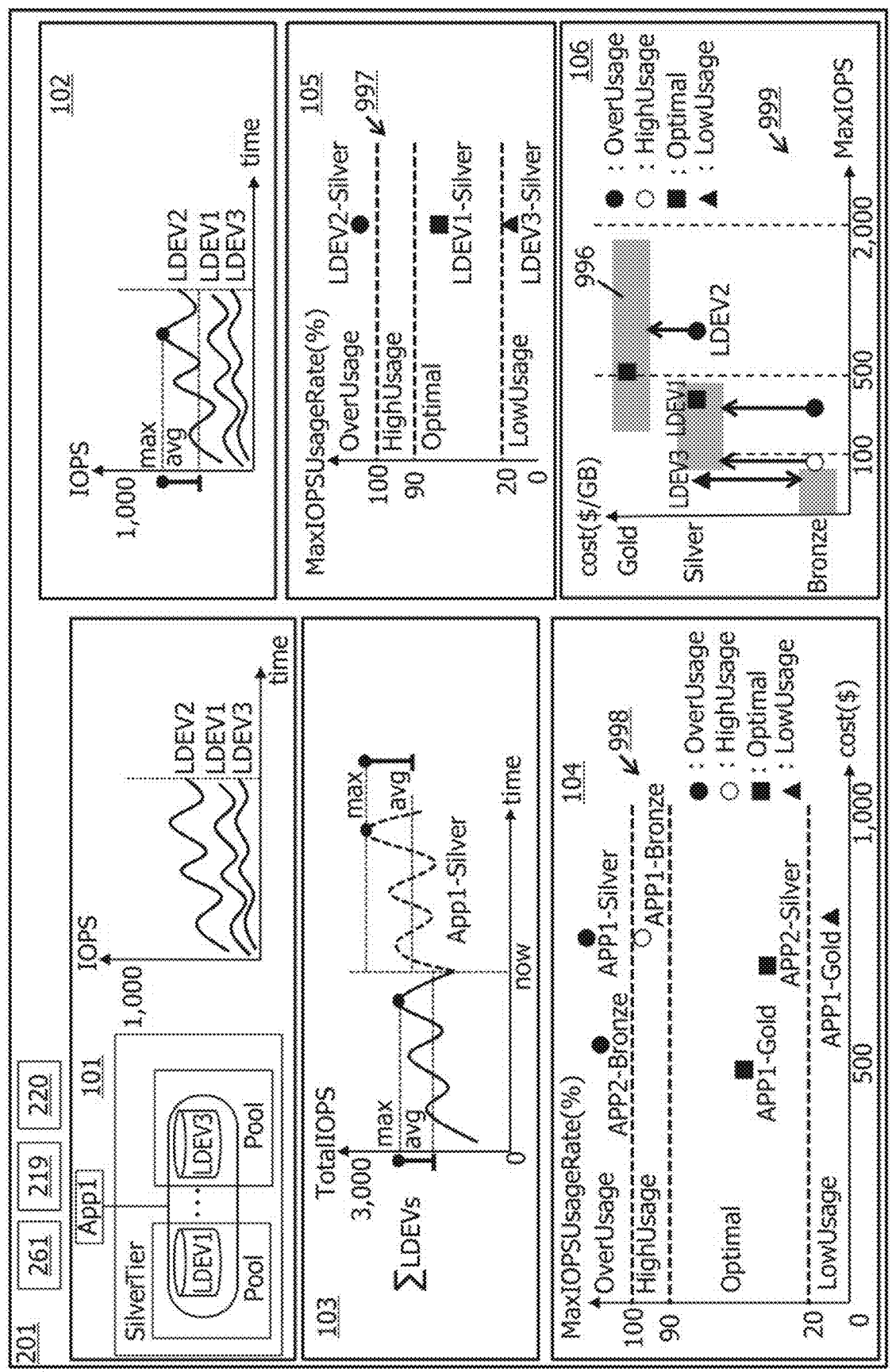
FIG. 1 is a schematic diagram of one embodiment of the present invention.

In the following description, an "interface section" may be one or more interfaces. The one or more interfaces may include at least a communication interface section out of a user interface section and the communication interface section. The user interface section may be at least one I/O device out of one or more I/O devices (for example, input devices (for example, a keyboard and a pointing device) and an output device (for example, a display device)) and a display computing machine, or may be an interface device for the at least one I/O device as an alternative to or in addition to the one I/O device. The communication interface section may be one or more communication interface devices. The one or more communication interface devices may be one or more communication interface devices of the same type (for example, one or more NICs (Network Interface Cards)) or may be two or more communication interface devices of different types (for example, the NIC and an HBA (Host Bus Adapter)).

In the following description, a "memory section" may be one or more memories. At least one memory may be a volatile memory or a nonvolatile memory. The memory section is mainly used at a time of processes performed by a processor section.

Furthermore, in the following description, a "PDEV section" may be one or more PDEVs. The "PDEV" means a physical storage device and is typically a nonvolatile storage device (for example, an auxiliary storage device) such as an HDD (Hard Disk Drive) or an SSD (Solid State Drive). The PDEV section may be a RAID group. The "RAID" is an abbreviation of Redundant Array of Independent (or Inexpensive) Disks.

Moreover, in the following description, a "storage section" includes at least a memory section out of the memory section and the PDEV section.

Furthermore, in the following description, the "processor section" may be one or more processors. While the at least one processor is typically a microprocessor such as a CPU (Central Processing Unit), the at least one processor may be a processor of the other type such as a GPU (Graphics Processing Unit). The one or more processors may be each a single core processor or a multicore processor. Part of the processors may be a hardware circuit performing part of or entirety of processes.

Furthermore, in the following description, a function is often described using an expression "kkk section" (exclusive of the interface section, storage section, and processor section); however, the function may be realized by causing the processor section to execute one or more computer programs, or may be realized by one or more hardware circuits (for example, FPGAs (Field-Programmable Gate Arrays) or ASICs (Application Specific Integrated Circuits)). In a case of realizing the function by causing the processor section to execute the one or more programs, a defined process is performed using the storage section and/or the interface section or the like as appropriate; thus, the function may beat least part of the processor section. A process described with a function assumed as a subject may be a process performed by the processor section or an apparatus having the processor section. Each program may be installed from a program source. The program source may be, for example, a program distribution computing machine or a computing machine readable recording medium (for example, a non-transitory recording medium). The description of each function is given as an example; thus, a plurality of functions may be integrated into one function or one function may be divided into a plurality of functions.

Furthermore, in the following description, information is often described using an expression such as "xxx table"; however, the information may be expressed in any data structure. In other words, to indicate that information does not depend on a data structure, the "xxx table" can be rephrased as "xxx information." Moreover, in the following description, a configuration of each table is an example and one table may be divided into two or more tables or all of or part of the two or more tables may be integrated into one table.

Furthermore, in the following description, an "optimization support system" may be configured with one or more computing machines. Specifically, in a case, for example, in which each computing machine has a display device and displays information on the display device of the computing machine, the computing machine may be a resource allocation optimization system. Furthermore, in a case, for example, in which a first computing machine (for example, a server) sends display information to a remote second computing machine (display computing machine (for example, a client)) and the display computing machine displays the information (in a case in which the first computing machine displays the information on the second computing machine), at least the first computing machine out of the first and second computing machines may be an optimization support system. The optimization support system may have the interface section, the storage section, and the processor section connected to the interface section and the storage section. "Displaying the display information" by the computing machine in the optimization support system may be displaying the display information on the display device owned by the computing machine, or may be sending the display information by the computing machine to the display computing machine (in the latter case, the display computing machine displays the display information).

Moreover, in the following description, in a case of describing elements of the same type without discriminating the elements, reference characters of the elements are used (for example, LDEV 1005), and in a case of describing the elements of the same type while discriminating the elements, IDs (for example, LDEV1 and LDEV2) of the elements are often used.

Furthermore, information such as a name or a number of each element may be adopted as identification information about the element.

Moreover, in the following description, an "application" may be one or more computer programs performing predetermined work by using one or more allocated storage resources.

Furthermore, in the following description, a "storage resource" is a resource related to a storage service and may be either a physical resource or a logical resource. For example, the "storage resource" may be each of a plurality of physical or logical nodes (for example, a server and a storage device) configuring a computing machine system, or may be each of a plurality of physical or logical components (for example, the processor section and the memory section) owned by each node. In the following description, an LDEV (logical storage device) is adopted as an example of the "storage resource." The LDEV may be a device based on the PDEV section or may be a virtual device according to a virtualization technique such as Thin Provisioning.

One embodiment of the present invention will be described hereinafter with reference to the drawings.

FIG. 1 is a schematic diagram of one embodiment of the present invention.

An optimization support system 201 according to the embodiment enables each customer utilizing a storage service (for example, a cloud service) to determine whether actual performances of a plurality of service tiers associated with one or a plurality of applications of the customer are appropriate. As the plurality of service tiers, service tiers which are, for example, a Gold tier, a Silver tier, and a Bronze tier are present. A plurality of LDEVs are classified to belong to the plurality of service tiers. The plurality of LDEVs are present in one or more data centers placed in, for example, one or more geological locations in regions including domestic and/or overseas regions (for example, across the world). One or more service tiers at the same level (for example, the same agreement performance) may be present in the one or more data centers.

The optimization support system 201 has a calculation section 261, a judgement section 219, and a proposal section 220. The optimization support system 201 performs processes 101, 103, and 104 related to support of an appropriate/inappropriate judgement for resource performance allocation, and processes 102, 105, and 106 related to a proposal of a re-tiering candidate of an inappropriate LDEV.

The process 101 will be described, for example, as follows.

The calculation section 261 collects management data including data related to usage of each of a plurality of LDEVs (for example, an LDEV1 to an LDEV3), from, for example, a plurality of data centers (or a system that manages the plurality of data centers) having the plurality of LDEVs. The management data includes data that indicates a time-series measured IOPS of each LDEV during an analysis period (for example, a certain fixed period). The "measured IOPS" is an actually measured IOPS. The "IOPS" is an example of a performance (for example, an I/O performance) and is an abbreviation of I/O per second.

The process 103 is a process for aggregating the LDEVs used by an application in a service tier. The process 103 will be described, for example, as follows.

The calculation section 261 adds up, per AppTier, measured IOPSs of all the corresponding LDEVs within a service tier that belongs to the AppTier to assume an addition result as a past Total IOPS. The "AppTier" is a set of an application and a service tier. In the present embodiment, selecting an AppTier may be synonymous with selecting the application included in the AppTier. For each AppTier, "corresponding LDEVs" are LDEVs allocated to the application that belongs to the AppTier. The "Total IOPS" is an example of a performance of the service tier. The past Total IOPS is calculated at each of a plurality of points in time during the analysis period. As a result, a time-series measured Total IOPS (time-series past Total IOPS) is obtained for each AppTier. It is noted that a performance other than the Total IOPS may be adopted as the performance of the service tier.

The calculation section 261 predicts a time-series future Total IOPS for an analysis period related to a future using the past Total IOPS per AppTier. As a result, a time-series predicted Total IOPS (time-series future Total IOPS) is obtained for each AppTier. The example depicted in FIG. 1 illustrates the time-series measured Total IOPS (refer to a solid line) and the time-series predicted Total IOPS (refer to a broken line) for the AppTier named App1-Silver. The App1-Silver means a set of an application 1 and a Silver tier. Hereinafter, notation "AppN-kkk" means a set of an application N and a kkk tier. Furthermore, unless specified otherwise, a "Total IOPS" may be either the measured Total IOPS or the predicted Total IOPS, hereinafter.

The calculation section 261 obtains an average Total IOPS during an analysis period and a maximum Total IOPS during the analysis period for each of the time-series measured Total IOPS and the time-series measured Total IOPS per AppTier. For each AppTier, at least one of the average Total IOPS and the maximum Total IOPS is an example of an intended performance for the service tier included in the AppTier. One (for example, the average Total IOPS out) of the average Total IOPS and the maximum Total IOPS is not necessarily calculated. In addition, as the intended performance of each AppTier, a performance other than at least one of the average Total IOPS and the maximum Total IOPS may be adopted. In the following description, unless specified otherwise, the "average Total IOPS" may be any of an average measured Total IOPS and an average predicted Total IOPS, and the "maximum Total IOPS" may be any of a maximum measured Total IOPS and a maximum predicted Total IOPS.

The calculation section 261 obtains an average IOPS usage rate and a maximum IOPS usage rate for each of the past and the future per AppTier. For each AppTier, the "average IOPS usage rate" is a ratio of the average Total IOPS of the AppTier to a Total agreement IOPS of the AppTier. For each AppTier, the "maximum IOPS usage rate" is a ratio of the maximum Total IOPS of the AppTier to the Total agreement IOPS of the AppTier. For each AppTier, the "Total agreement IOPS" is an example of an agreement performance and is according to the agreement IOPS of the service tier included in the AppTier and the number of corresponding LDEVs (LDEVs allocated to the application included in the AppTier out of the LDEVs belonging to the service tier) (for example, a product between the agreement IOPS and the number of the corresponding LDEVs. For each AppTier, the "agreement IOPS" is an IOPS that serves as a reference per LDEV of the service tier included in the AppTier (for example, a maximum value of IOPSs that can be exerted per LDEV). For each AppTier, at least one of the average IOPS usage rate and the maximum IOPS usage rate is an example of a performance ratio. In the present embodiment, for each AppTier, the maximum IOPS usage rate is an example of the performance ratio, and an example of the intended performance is the maximum IOPS usage rate. Adopting such maximum values makes it possible to expect enhancement of a certainty that a risk such as over-performance can be avoided.

The calculation section 261 calculates a cost per AppTier. For each AppTier, the cost is based on a used capacity that is a capacity used by the application included in the AppTier among capacities of all the corresponding LDEVs belonging to the service tier included in the AppTier. Specifically, for each AppTier, the cost may be, for example, a product between the used capacity and a unit price (price per unit capacity) of the service tier.

The process 104 is a process related to an appropriate/inappropriate judgement result for the application corresponding to the service tier. The process 104 will be described, for example, as follows.

The judgement section 219 displays a service tier map 998. The service tier map 998 is a map (for example, a map including a two-dimensional orthogonal coordinate system) having a vertical axis (an example of a first axis) corresponding to the maximum IOPS usage rate and a horizontal axis (an example of a second axis) corresponding to the cost.

On the service tier map 998, for each AppTier, a display object (for example, graphics) is placed at a position according to the calculated maximum IOPS usage rate and the calculated cost of the AppTier. For each AppTier, the maximum Total IOPS of the AppTier is normalized to the maximum IOPS usage rate on the basis of the Total agreement IOPS of the AppTier, and the maximum IOPS usage rates and the costs of a plurality of AppTiers are expressed on the same map that is the service tier map 998. Checking the map enables the user to determine whether the maximum. Total IOPSs of the plurality of AppTiers are appropriate.

For each AppTier, the "maximum IOPS usage rate" determining the position at which the display object is placed may be at least one of a maximum measured IOPS usage rate (a ratio of the maximum measured Total IOPS to the Total agreement IOPS) and a maximum predicted IOPS usage rate (a ratio of the maximum predicted Total IOPS to the Total agreement IOPS). In a case of adopting both the maximum measured IOPS usage rate and the maximum predicted IOPS usage rate, two display objects, for example, are placed on the service tier map 998 for the same AppTier. The customer can thereby judge whether the maximum Total IOPS is appropriate for each AppTier with respect to one of or both of the past and the future.

The service tier map 998 is demarcated into an appropriate region ("Optimal") that is a region corresponding to an appropriate usage rate range (a range of the maximum IOPS usage rate) and an inappropriate region that is a region corresponding to an inappropriate usage rate range. For the appropriate usage rate range, an example of a lower limit is "20" and an example of an upper limit is "90." For each AppTier, whether the display object of the AppTier is present in the appropriate region corresponds to whether the maximum Total IOPS of the AppTier is appropriate; thus, it is easy for the customer to judge whether the maximum Total IOPS of each AppTier is appropriate. As an alternative to or in addition to customer's judging whether the maximum Total IOPS of each AppTier is appropriate by visually checking the service tier map 998, the judgement section 219 may judge whether the maximum Total IOPS of each AppTier is appropriate by comparing the maximum IOPS usage rate of each AppTier with each of the lower limit and the upper limit of the appropriate usage rate range, and may display a judgement result.

The inappropriate range is demarcated into a low region ("LowUsage") that is a region corresponding to a usage rate range defined as being inappropriately low (for example, a range lower than the lower limit of the appropriate usage rate range), a high region ("HighUsage") that is a region corresponding to a usage rate range defined as being inappropriately high (for example, a range higher than the upper limit of the appropriate usage rate range and equal to or lower than a certain usage rate), and an over-region ("OverUsage") that is a region corresponding to a usage rate range defined as exceeding an ideal maximum value (for example, "100") of the maximum IOPS usage rate. This can facilitate determining how the maximum Total IOPS is inappropriate. The judgement section 219 may judge whether how the maximum. Total IOPS is inappropriate by comparing at least one of an upper limit and a lower limit for each of the low region, the high region, and the over-region with the maximum IOPS usage rate based on the inappropriate maximum Total IOPS.

As described above, the service tier map 998 that enables the appropriate/inappropriate judgement (OverUsage, HighUsage, Optimal, or LowUsage) by comparison of the maximum IOPS usage rate with thresholds is displayed. For each AppTier, a display mode (for example, a shape and a color) of each display object may vary depending on where the display object is placed, "OverUsage," "HighUsage," "Optimal," or "LowUsage."

These are the description of the processes 101, 103, and 104.

After the processes 101, 103, and 104, the customer can find an inappropriate application that is the application included in the AppTier for which the maximum Total IOPS is inappropriate. Subsequently, after the processes 102 and 105, the customer can find an inappropriate LDEV (an LDEV the IOPS of which deviates from an appropriate range of the service tier to which the LDEV belongs (an IOPS appropriate range)) from the corresponding LDEVs corresponding to the inappropriate application. Such procedures are suited for the following technical characteristics and are expected to contribute to facilitating appropriately maintaining resource performance allocation (specifically, favorably keeping the balance between the performance ratio and the cost).

A performance exerted by an application is influenced by a performance of each LDEV allocated to the application.

In general, the LDEVs are more than applications to be operated.

Furthermore, after the process 106, the customer can receive a proposal of a service tier having an appropriate range overlapped by the IOPS of an inappropriate LDEV as a re-tiering candidate of the inappropriate LDEV. The customer can give permission to re-tier the LDEV to the service tier that is the proposed re-tiering. In this way, it is possible to appropriately maintain the resource performance allocation.

The processes 102, 105, and 106 will be described below. It is noted that unless specified otherwise, the IOPS may be any of the measured IOPS and the predicted IOPS for each LDEV.

The process 102 will be described, for example, as follows.

In a case of receiving selection of at least one AppTier from the customer through the service tier map 998 (for example, a GUI (Graphical User Interface)), the judgement section 219 calculates, for each LDEV allocated to at least one application belonging to the at least one AppTier, a maximum IOPS (at least one of a maximum measured IOPS and a maximum predicted IOPS) and an average IOPS (at least one of an average measured IOPS and an average predicted IOPS) during each of past, current, and future analysis periods. The judgement section 219 may not calculate one of the maximum IOPS and the average IOPS, or may calculate an IOPS other than the maximum IOPS and the average IOPS.

The process 105 relates to an appropriate/inappropriate judgement for each LDEV. The process 105 will be described, for example, as follows.

The calculation section 261 obtains, for each LDEV, a maximum IOPS usage rate (a ratio of the maximum IOPS to the agreement IOPS) and an average IOPS usage rate (a ratio of the average IOPS to the agreement IOPS) from the maximum IOPS and the average IOPS calculated in the process 102 and the agreement IOPS of the service tier to which the LDEV belongs. The judgement section 219 judges, for each LDEV, whether the LDEV is appropriate by determining whether the maximum IOPS usage rate overlaps an appropriate usage rate range. A lower limit and an upper limit of the "appropriate usage rate range" for the LDEV may be the same as or different from the lower limit and the upper limit of the appropriate usage rate range (the appropriate range of the maximum IOPS usage rate) for the service tier. The judgement section 219 may display an LDEV map 997 having a region corresponding to the appropriate range of the maximum IOPS usage rate and a region corresponding to an inappropriate range thereof. The LDEV map 997 has an axis corresponding to the maximum IOPS usage rate. For each LDEV, a display object (for example, graphics) is placed at a position according to the maximum IOPS usage rate of the LDEV. Checking the LDEV map 997 enables the customer to discriminate which LDEV is an inappropriate LDEV.

The process 106 relates to a proposal of the re-tiering candidate of the inappropriate LDEV. The process 106 will be described, for example, as follows.

The proposal section 220 makes a re-tiering proposal if one or more inappropriate LDEVs are present for an intended application that is an application included in at least one AppTier (an example of an AppTier corresponding to a predetermined condition) selected through the service tier map 998. The re-tiering proposal is to propose a service tier candidate that is a re-tiering for each of the one or more inappropriate LDEVs. The inappropriate LDEV is an LDEV having the maximum IOPS that deviates from the appropriate range of the service tier to which the LDEV belongs (the appropriate range of the maximum IOPS). For the inappropriate LDEV, the service tier candidate as the re-tiering is at least one service tier having an appropriate performance range overlapping the maximum IOPS of the inappropriate LDEV. Specifically, in a case in which the maximum IOPS of the inappropriate LDEV is, for example, larger than the appropriate range of the service tier to which the LDEV belongs, a service tier higher in agreement IOPS than the service tier to which the inappropriate LDEV belongs is determined as the re-tiering candidate of the inappropriate LDEV. On the other hand, in a case in which the maximum IOPS of the inappropriate LDEV is smaller than the appropriate range of the service tier to which the LDEV belongs, a service tier lower in agreement IOPS than the service tier to which the inappropriate LDEV belongs is determined as the re-tiering candidate of the inappropriate LDEV. Permitting the LDEV to re-tier according to the received proposal, that is, the inappropriate LDEV to re-tier to change the inappropriate LDEV to an appropriate LDEV enables the customer to appropriately maintain the resource performance allocation.

The re-tiering proposal is, for example, to display a re-tiering candidate map 999. In the re-tiering candidate map 999, a vertical axis (an example of a first axis) corresponds to the service tier, and a horizontal axis (an example of a second axis) corresponds to the maximum IOPS. In other words, the re-tiering candidate map 999 is a map including, for example, a two-dimensional orthogonal coordinate system. On the re-tiering candidate map 999, an appropriate range zone 996 that is a display object having a length corresponding to the appropriate range of each service tier is placed, per service tier included in each AppTier including the intended application as a constituent element, at a position according to the appropriate range. For each of the corresponding LDEVs (at least each inappropriate LDEV) corresponding to the intended application, the display object is placed at a position according to the maximum IOPS of the LDEV and the service tier to which the LDEV belongs. Checking such a re-tiering candidate map 999 enables the customer to find a storage tier candidate as the re-tiering (that is, to perceive the service tier corresponding to the appropriate range zone 996 hit by a moving point of gaze) by moving a point of gaze (a customer's gaze) from the position of the display object of the inappropriate LDEV either upward or downward in parallel to the vertical axis. On the re-tiering candidate map 999, for at least one inappropriate LDEV, an arrow that is an example of a display object that indicates a re-tiering direction of the LDEV (that is, an arrow indicating where the agreement maximum IOPS re-tiers to, a storage tier having a higher agreement IOPS or a storage tier having a lower agreement IOPS) may be displayed.

These are the description of an outline of the present embodiment.

According to the present embodiment, the customer has advantages as described above, while a storage service provider is expected to have the following advantages.

Setting the position at which the LDEV is placed to the service tier having the relatively low agreement IOPS makes it possible to appropriately increase a spared capacity for the PDEV section that forms the basis for the LDEV that can belong to the service tier having the relatively high agreement IOPS, and to continue resource allocation without taking measures such as addition of a PDEV to the PDEV section. In other words, it is possible to expect the realization of highly efficient resource allocation as a whole.

It is noted that in the present embodiment, in a case in which only one application is present for at least one customer, each AppTier may correspond to each service tier associated with the one application (that is, the "AppTier" may be rephrased as "service tier").

The present embodiment will be described hereinafter in detail.

Figure 2:
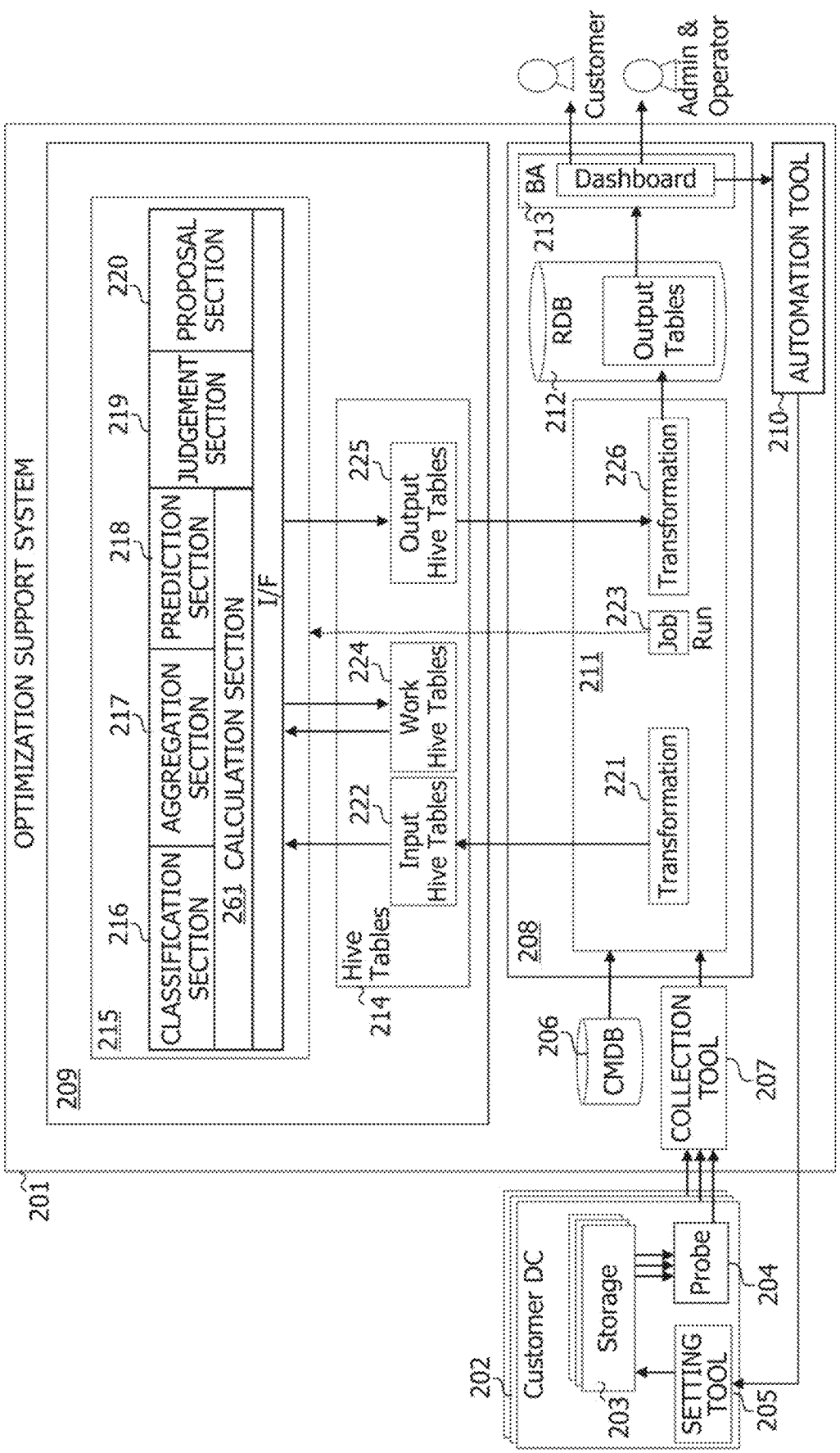
FIG. 2 is an overall configuration diagram of a system.

FIG. 2 is a configuration diagram of an overall system according to the present embodiment.

A data center 202 of each customer is connected to the optimization support system 201.

Each data center 202 has one or more storage devices 203, a Probe 204 that collects Configuration Data that is data indicating a configuration of the one or more storage devices 203 and Performance Data that is data indicating a performance of the one or more storage devices 203, and a setting tool 205 that allocates an internal component (resources) to each storage device 203. At least one data center 202 may provide a plurality of services by executing a plurality of (for example, several thousands of) applications. The Performance Data may be an example of data related to each of a plurality of storage resources.

The optimization support system 201 has a CMDB (customer DataBase) 206, a collection tool 207, a visualization server 208 that is a server performing data transformation and visualization, an analysis server 209 that is a server performing data analysis, and an automation tool 210. The visualization server 208 and the analysis server 209 can communicate with each other via, for example, a network.

The CMDB 206 stores information indicating the association of a service (for example, an application) with a storage internal volume (for example, LDEVs) and information for managing a service level of each service (for example, an SLA (Service Level Agreement) for each application).

The collection tool 207 collects the Configuration Data and the Performance Data from the Probes 204 within one or more data centers 202.

The visualization server 208 has an ETL (Extract, Transform, Load) 211, an RDB (Relational DataBase) 212, and a BA (Business Application) 213. The RDB 212 stores Output Tables 309.

The analysis server 209 has Hive Tables 214 storing data and a Spark 215 executing processes. The Hive Tables 214 include Input Hive Tables 222, Work Hive Tables 224, and Output Hive Tables 225. At least part of the Hive Tables 214 and the Output Tables 309 are an example of the management data.

The Spark 215 has a plurality of functions. The plurality of functions are as follows.
- A classification section 216 that is realized by causing a processor section to execute a program for classifying application volumes to belong to service tiers.
- An aggregation section 217 that is realized by causing the processor section to execute a program for aggregating the Performance Data.
- A prediction section 218 that is realized by causing the processor section to execute a program for predicting a resource performance.
- The judgement section 219 that is realized by causing the processor section to execute a program for performing optimization support such as display of the service tier map.
- The proposal section 220 that is realized by causing the processor section to execute a program for performing optimization support such as making a proposal of the re-tiering candidate of the inappropriate LDEV.

It is noted that the classification section 216, the aggregation section 217, and the prediction section 218 can be included in the calculation section 216.

A Transformation 221 in the ETL 211 transforms data from the CMDB 206 and the collection tool 207 and stores the transformed data in the Input Hive Tables 222 in the Hive Tables 214.

When a Job 223 runs in the ETL 211, the various functions 216 to 220 on the Spark 215 sequentially run.

The Input Hive Tables 222 are input to the Spark 215, and the Spark 215 retains temporary data in the Work Hive Tables 224 to utilize the temporary data, and stores a result in the Output Hive Tables 225.

A Transformation 226 in the ETL 211 transforms data from the Output Hive Tables 225 and stores the transformed data in the Output Tables 309 in the RDB 212.

The BA 213 acquires the data from the Output Tables 309 in the RDB 212, and displays the data on a Dashboard. Specifically, the judgement section 219 and the proposal section 220 display, for example, the maps 997 to 999 described above through the BA 213. For example, the customer or an administrator or an operator of the optimization support system 201 can view information displayed through the BA 213.

By invoking the automation tool 210 by the BA 213, it is possible to execute resource re-allocation.

The optimization support system 201 and each of the data centers 202 may be an example of a computing machine system. At least one of the optimization support system 201 and each data center 202 may be a system that provides a cloud service. At least one of the optimization support system 201 and each data center 202 may be one or more physical servers (for example, server clusters) or may include at least one virtual server (for example, a VM (Virtual Machine)). Furthermore, in each data center 202, part of the one or more storage devices 203 may be a virtual storage device. At least one of the data centers 202 may be a system constructed as an SDx (Software-Defined anything). For example, an SDS (Software Defined Storage) or an SDDC (Software-defined Datacenter) can be adopted as the SDx.

Each of the plurality of service tiers may be present in each data center 202 or present across two or more data centers 202. One or a plurality of data centers 202 may be present in one geological location (for example, in one country).

Figure 3:
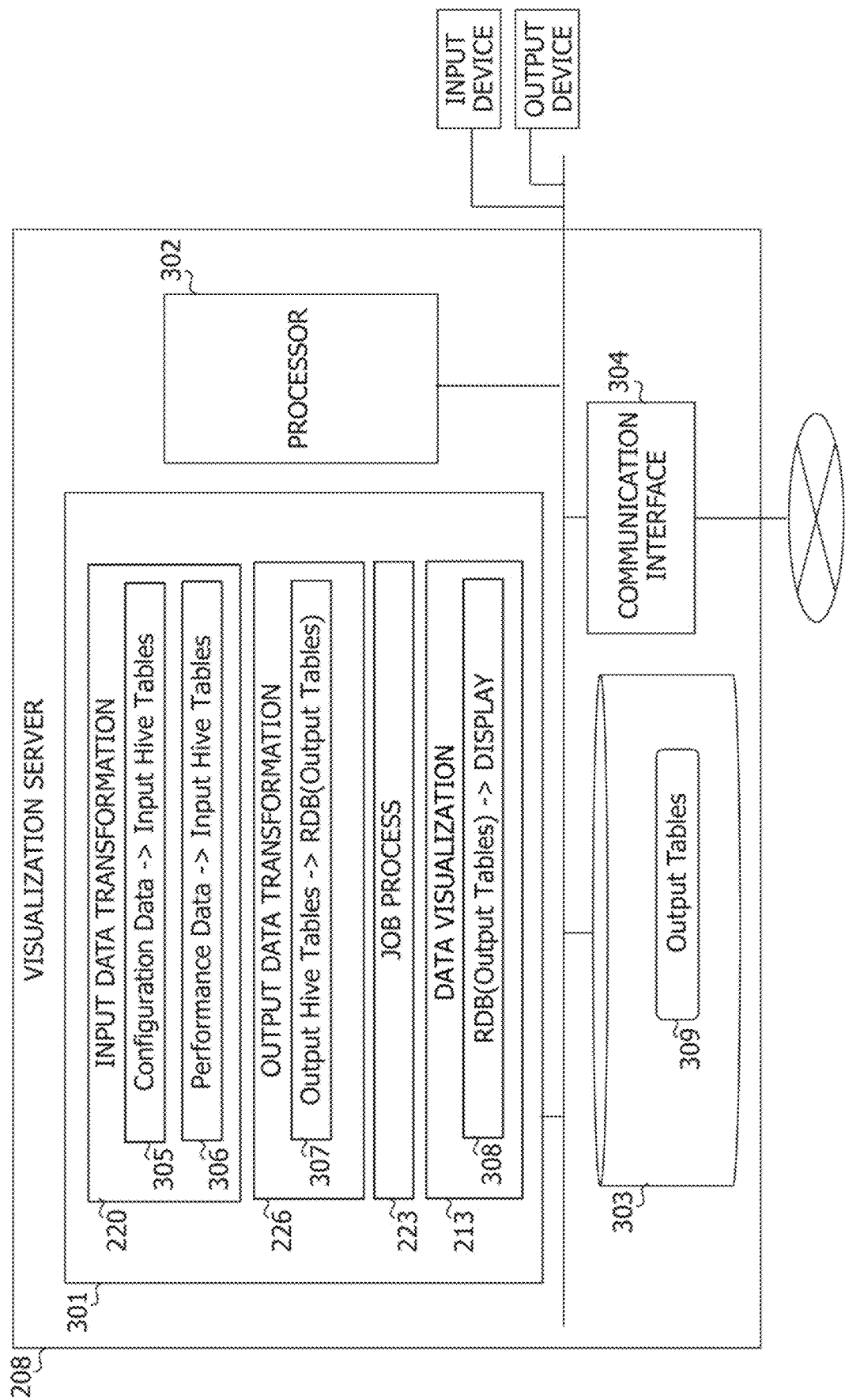
FIG. 3 is a configuration diagram of a visualization server.

FIG. 3 is a configuration diagram of the visualization server 208.

The visualization server 208 realizes input data transformation 220, output data transformation 226, a job process (job definition and execution) 223, and data visualization 213, and these functions can be realized specifically by hardware configured with a memory 301, a processor 302, a storage device 303, and a communication interface 304. In other words, the functions can be realized by reading one or more programs related to the ETL 211 from the memory 301 and executing the one or more programs by the processor 302. The communication interface 304 is an example of the interface section, the memory 301 is an example of the memory section, the storage device 303 is an example of the PDEV section, and the processor 302 is an example of the processor section connected to the interface section and the storage section. Input devices (for example, a keyboard and a pointing device) and an output device (for example, a display device) may be connected to the visualization server 208. The Dashboard may be displayed on the output device.

Furthermore, the storage device 303 stores the Output Tables 309.

Input information from the CMDB 206 and the collection tool 207, input/output information exchanged between the visualization server 208 and the analysis server 209, and input/output information exchanged between the visualization server 208 and a remote terminal by way of a web browser are input to and output from the communication interface 304.

The input data transformation 220 includes a process 305 for transforming the Configuration Data (for example, a CSV file) into the Input Hive Tables 222, and a process 306 for transforming the Performance Data (for example, a CSV file) into the Input Hive Tables 222.

The output data transformation 226 includes a process 307 for transforming the Output Hive Tables 225 into the Output Tables 309 in the RDB 212.

The data visualization 213 includes a process 308 for acquiring the data from the Output Tables 309 in the RDB 212 and displaying the data.

Figure 4:
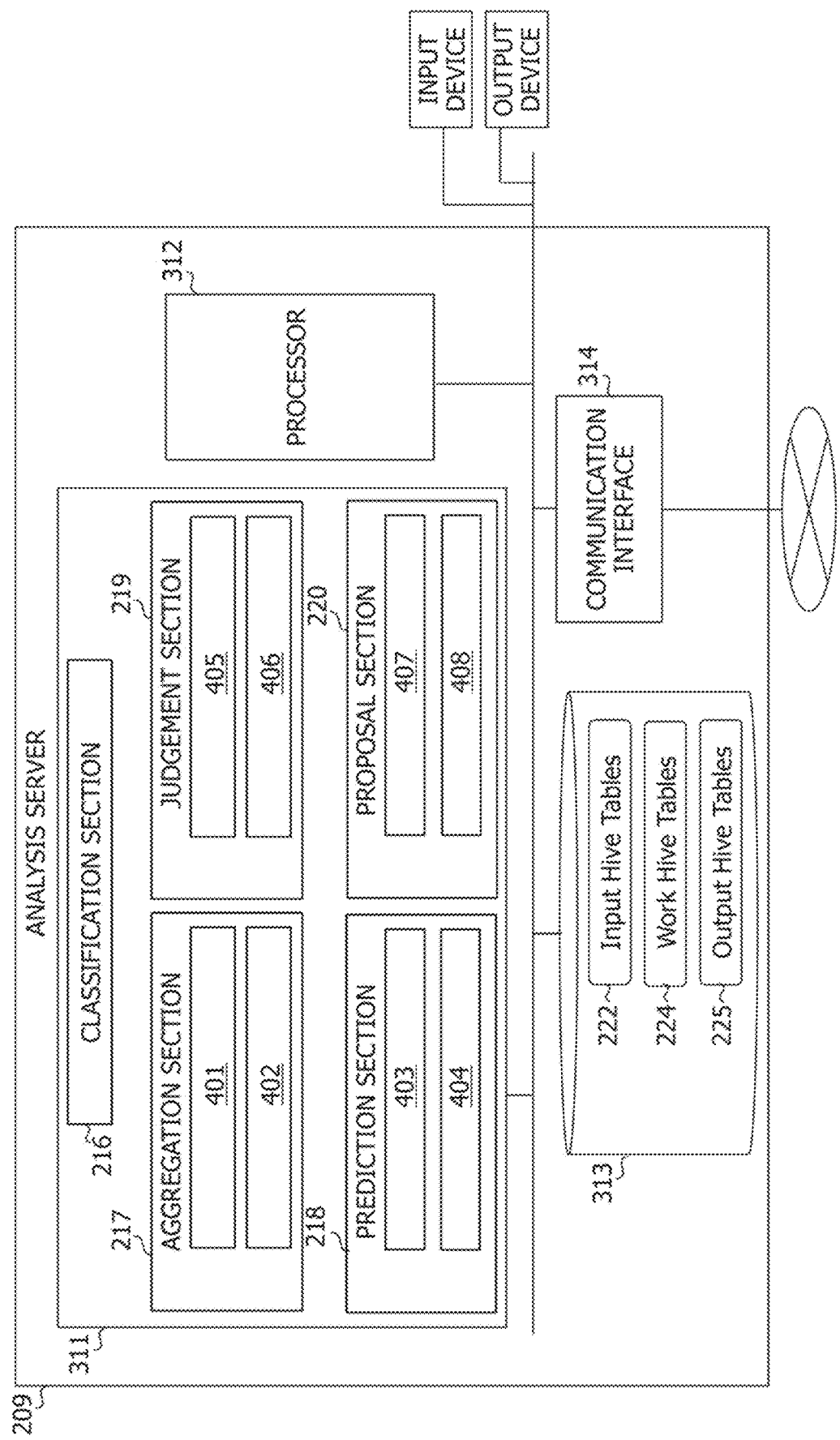
FIG. 4 is a configuration diagram of an analysis server.

FIG. 4 is a configuration diagram of the analysis server 209.

The analysis server 209 has such functions as the classification section 216, the aggregation section 217, the prediction section 218, the judgement section 219, and the proposal section 220 as described above. These functions can be realized specifically by hardware configured with a memory 311, a processor 312, a storage device 313, and a communication interface 314. In other words, these functions can be realized by reading one or more programs related to the Spark 215 from the memory 311 and executing the one or more programs by the processor 312. The communication interface 314 is an example of the interface section, the memory 311 is an example of the memory section, the storage device 313 is an example of the PDEV section, and the processor 312 is an example of the processor section connected to the interface section and the storage section. The input devices (for example, the keyboard and the pointing device) and the output device (for example, the display device) may be connected to the analysis server 209.

Furthermore, the storage device 313 stores the Input Hive Tables 222, the Work Hive Tables 224, and the Output Hive Tables 225.

The input/output information exchanged between the analysis server 209 and the visualization server 208 are input to and output from the communication interface 314.

The aggregation section 217 performs a process 401 for aggregating resource performances in view of each service tier for each application, and a process 402 for aggregating resource performances in view of an analysis period. The process 401 is included in the process 103 depicted in FIG. 1. The process 402 is included in the process 101 depicted in FIG. 1.

The prediction section 218 performs a process 403 for generating a learning model and a process 404 for predicting resource performances using the learning model. The process 404 is included in the process 103 depicted in FIG. 1. It is noted that for the process 403 for generating the learning model from a time-series resource performance (for example, the measured IOPS) and the process 404 for predicting a future time-series resource performance using the learning model, a technique disclosed in Japanese Patent Application No. 2017-209178 that is not published yet at a time of filing the present application can be utilized.

The judgement section 219 performs a process 405 for supporting an appropriate/inappropriate judgement per AppTier and a process 406 for supporting an appropriate/inappropriate judgement of each LDEV. The service tier map 998 is displayed by the process 405. The LDEV map 997 is displayed by the process 406.

The proposal section 220 performs a process 407 for setting an appropriate range of a service tier and a process 408 for calculating a proposal of the re-tiering candidate of an LDEV. The re-tiering candidate map 999 is displayed by the processes 407 and 408.

Figure 5:
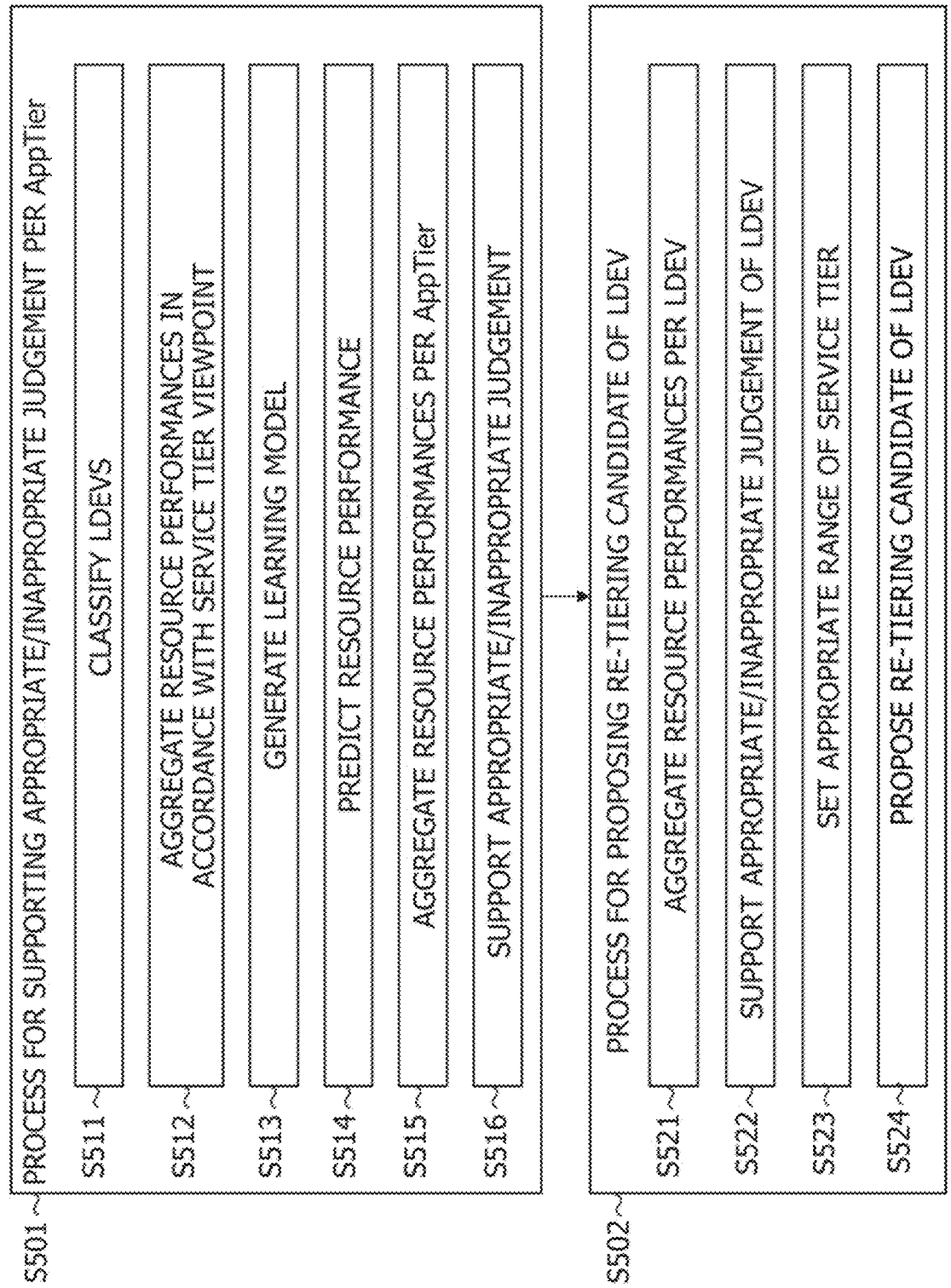
FIG. 5 depicts a flow of processes performed in the analysis server.

FIG. 5 depicts a flow of processes performed in the analysis server 209.

The analysis server 209 supports the appropriate/inappropriate judgement per AppTier (S501) and then proposes the re-tiering candidate of the LDEV (S502).

A flow of S501 is, for example, as follows. In other words, the classification section 216 classifies the LDEVs allocated to an application to belong to service tiers (S511). The aggregation section 217 aggregates the resource performances in the service tier corresponding to the application (S512). The prediction section 218 generates, for each LDEV, a learning model on the basis of time-series data (for example, data included in the Input Hive Tables 222) indicating an actual performance (IOPS) and an actual used capacity (consumed storage capacity) of the LDEV during an analysis period (S513), and predicts a resource performance per AppTier by predicting a future performance and a future used capacity of each LDEV using the learning model (S514). The aggregation section 217 aggregates the resource performances during the analysis period (for example, the analysis period in the past or the future) per AppTier (S515). The judgement section 219 generates and displays the service tier map 998 for supporting the appropriate/inappropriate judgement per AppTier (S516).

A flow of S502 is, for example, as follows. In other words, the aggregation section 217 aggregates the resource performances during the analysis periods per LDEV (S521). The aggregation section 217 obtains, for example, the maximum IOPS and the average IOPS per LDEV (refer to the process 102 depicted in FIG. 1). The proposal section 220 supports the appropriate/inappropriate judgement of the LDEV corresponding to each service tier (S522). In S522, the LDEV map 997, for example, is displayed. The proposal section 220 sets the appropriate range of each service tier (S523). The proposal section 220 proposes the re-tiering candidate of the LDEV (S524).

Figure 6:
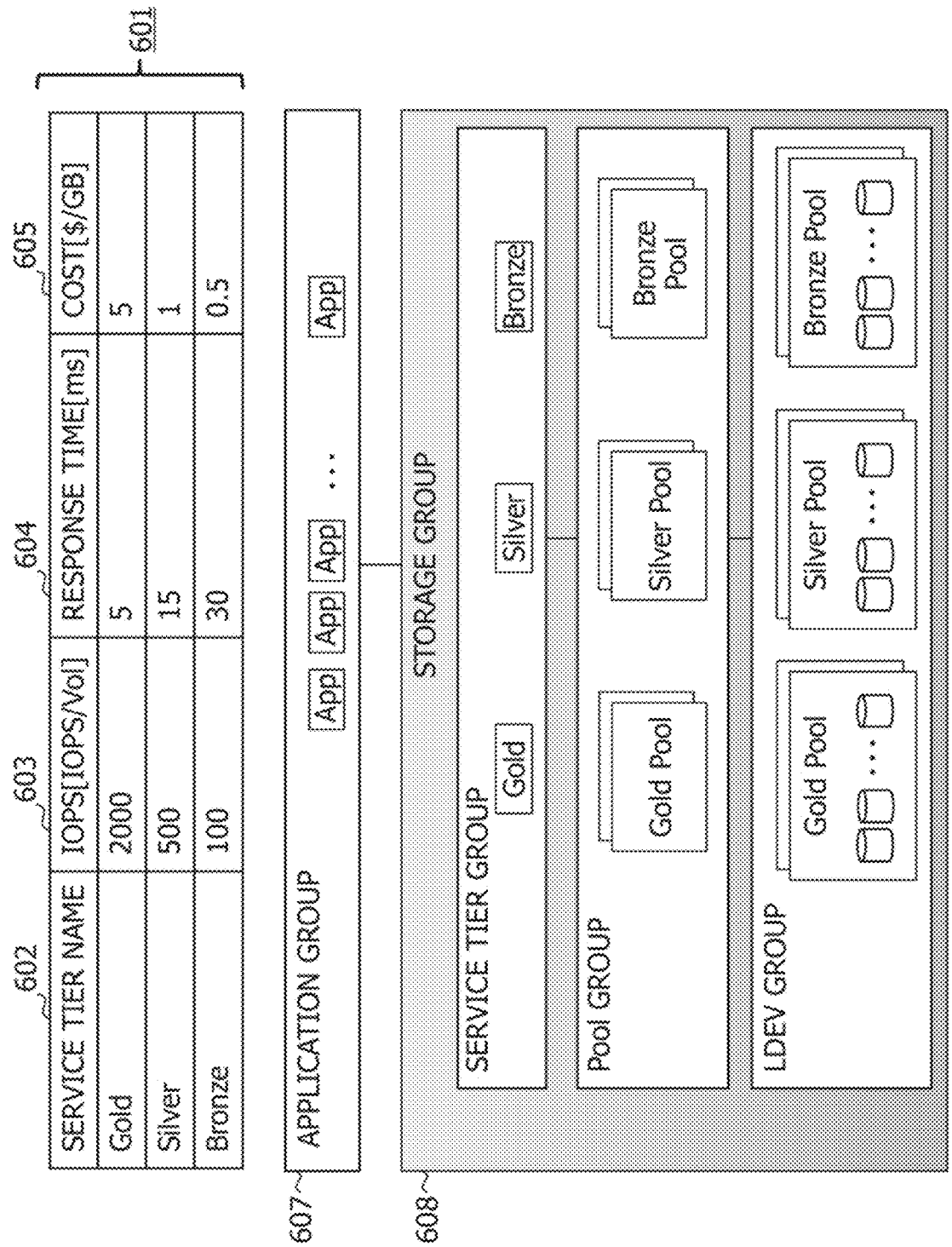
FIG. 6 depicts types of resources of a storage service.

FIG. 6 depicts types of resources of the storage service.

Information 601 is an example of information obtained from, for example, the Input Hive Tables 222. Pieces of information such as a service tier name 602 indicating a name of a service tier, an IOPS 603 indicating the agreement IOPS of the service tier, response time 604 indicating agreement response time of the service tier (response time supposed to be exerted by the service tier and an example of a performance), and a unit price 605 indicating a unit price (price per unit capacity) of the service tier are defined per service tier.

An application group 607 configured with a plurality of applications and a storage group 608 including a plurality of LDEVs allocated to the plurality of applications are present. In the storage group 608, the plurality of LDEVs are present in a plurality of pools classified into pools corresponding to a plurality of service tiers.

Figure 7:
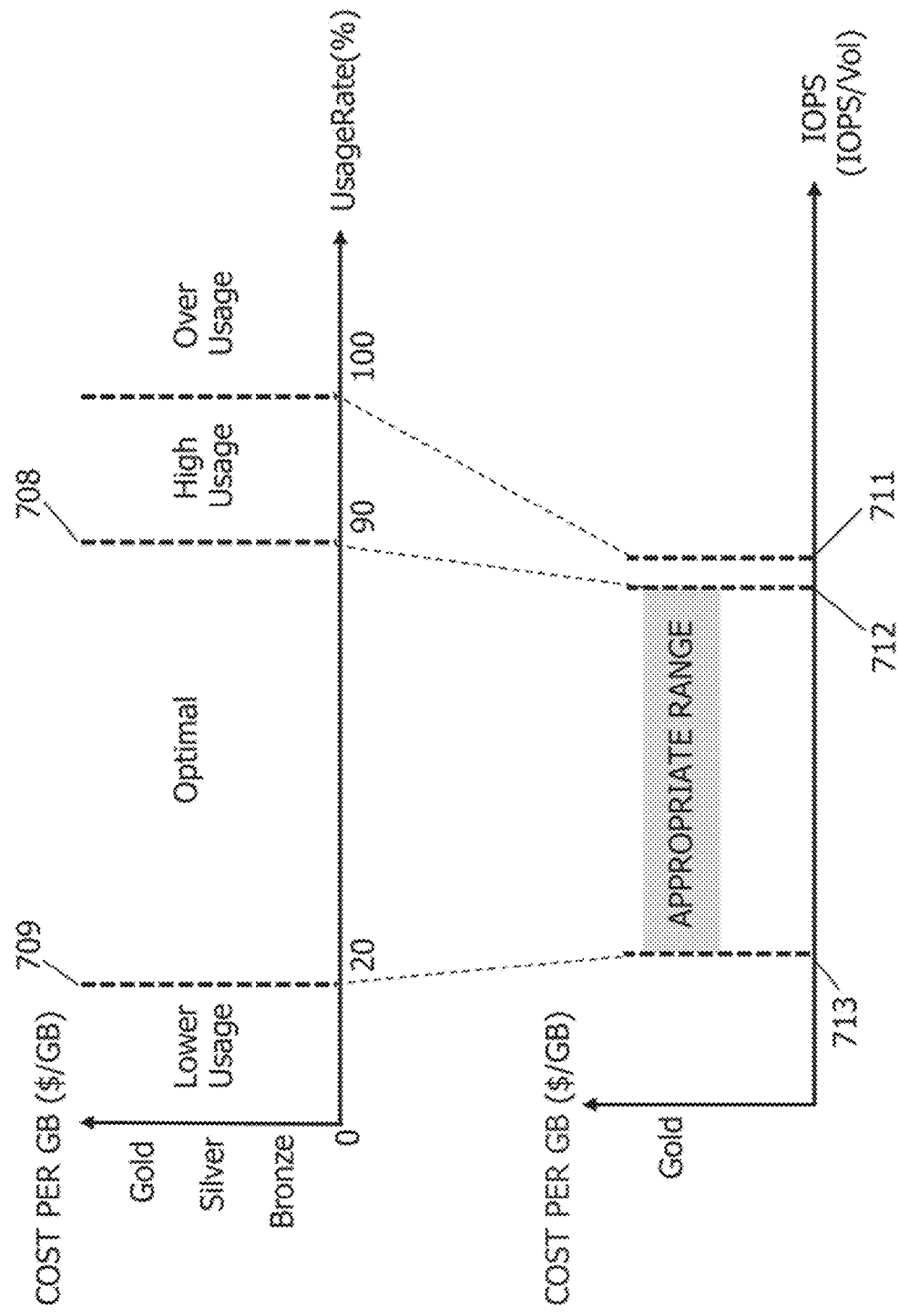
FIG. 7 is an explanatory diagram related to an appropriate range of each service tier.

FIG. 7 is an explanatory diagram related to the appropriate range of each service tier.

For describing an index of the appropriate/inappropriate judgement of the service tier, a graph 701 is provided such that a vertical axis represents the cost per GB of the service tier and a horizontal axis represents the maximum IOPS usage rate. According to the graph, an agreement maximum IOPS is higher as the cost per GB of the service tier is higher and the service tier is, therefore, higher in level.

Furthermore, according to the graph, the ranges such as OverUsage, HighUsage, Optimal, and LowerUsage are defined, for example, as follows.

OverUsage is the range in which the maximum IOPS usage rate is higher than 100% (an example of the ideal maximum value).

HighUsage is the range in which the maximum IOPS usage rate is higher than 90% (an example of the upper limit of the appropriate usage rate range) and equal to or lower than 100%.

Optimal (that is, appropriate usage rate range) is the range in which the maximum IOPS usage rate is equal to or higher than 20% (an example of the lower limit of the appropriate usage rate range) and equal to or lower than 90%.

LowerUsage is the range in which the maximum IOPS usage rate is lower than 20%.

According to the description of FIG. 7, a maximum value 708 of an appropriate IOPS usage rate (the upper limit of Optimal) is 90%, and a minimum value 709 of the appropriate IOPS usage rate (the lower limit of Optimal) is 20%. While the index of the appropriate/inappropriate judgement of each service tier is assumed to be common in the present embodiment, different indexes may be adopted for the service tiers.

The appropriate range of each service tier (appropriate IOPS range) is determined, per service tier, on the basis of an agreement IOPS 711 of the service tier, a maximum value 708 of the appropriate IOPS usage rate, and the minimum value 709 of the appropriate IOPS usage rate. The Gold tier will be described by way of example. A maximum value 712 of an appropriate IOPS and a minimum value 713 thereof of the Gold Tier are as follows.

Figure 8:
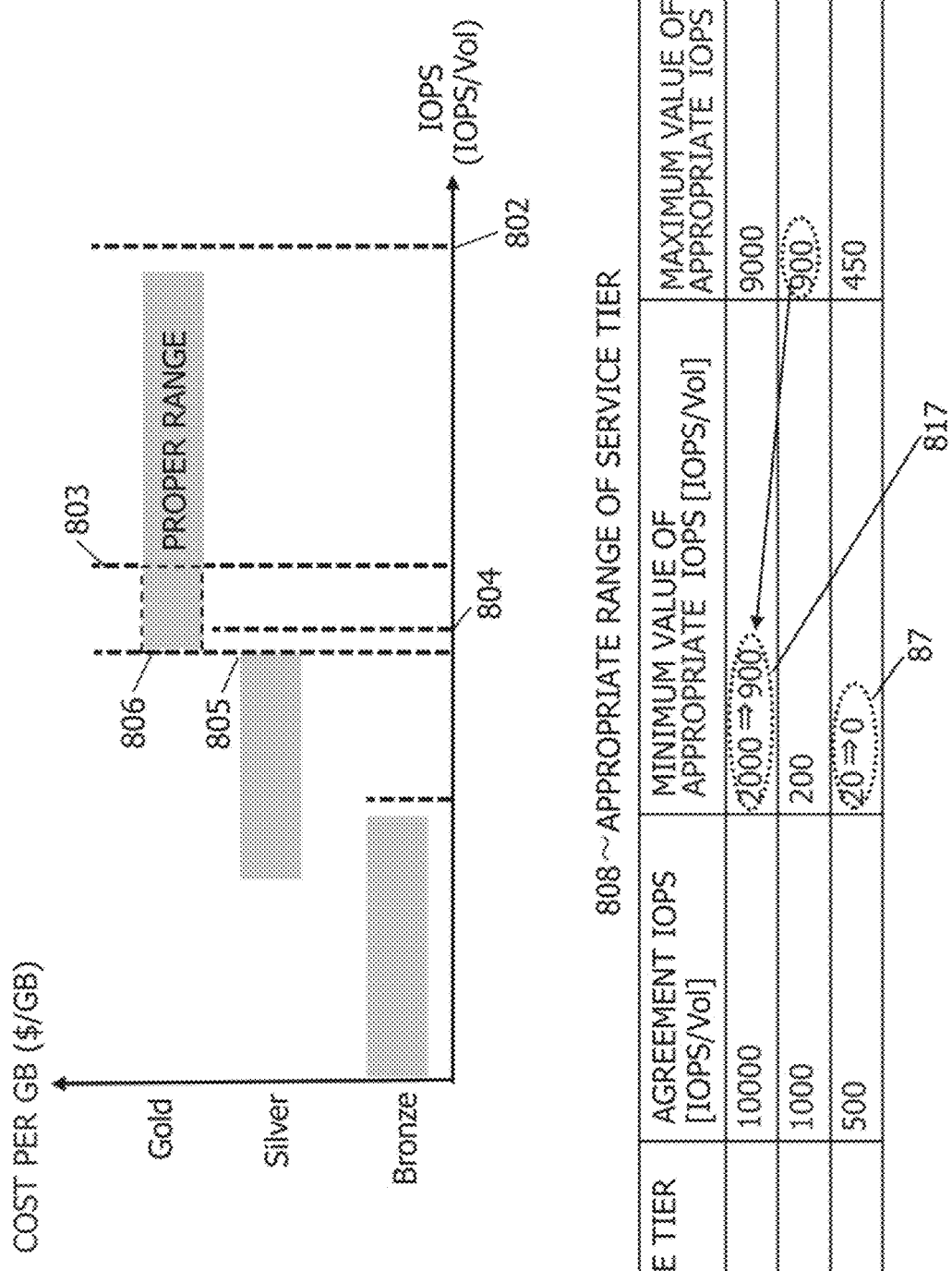
FIG. 8 is an explanatory diagram related to correction of the appropriate range of each service tier.

Maximum value 712 of appropriate
  IOPS=Agreement IOPS 711×Maximum value
  708 of appropriate IOPS usage rate Minimum value 713 of appropriate
  IOPS=Agreement IOPS 711×Minimum value
  709 of appropriate IOPS usage rate FIG. 8 is an explanatory diagram related to correction of the appropriate range of each service tier.

In a case of presence of a non-overlapping range in a coverage of two or more appropriate ranges of two or more service tiers (a range in which the two or more appropriate ranges do not overlap), the proposal section 220 eliminates the non-overlapping range by making a correction to extend an intended appropriate range. The two or more service tiers mentioned herein are the service tiers included in two or more AppTiers each including the same application. The "intended appropriate range" is an appropriate range having a minimum value closest to a maximum value of the non-overlapping range. The correction is to lower the minimum value of the intended appropriate range until the non-overlapping range is eliminated.

A specific example of the correction of the appropriate range of the service tier will be described with reference to FIG. 8.

As for the appropriate range of the Gold tier, an agreement IOPS 802 of the Gold tier is 10,000 [IOPS/Vol] and the minimum value of the appropriate IOPS usage rate is 20% as described above; thus, a minimum value (before correction) 803 of the appropriate IOPS of the Gold tier is 2,000 [IOPS/Vol].

As for the appropriate range of the Silver tier, an agreement IOPS 804 of the Silver tier is 1,000 [IOPS/Vol] and the maximum value of the appropriate IOPS usage rate is 90% as described above; thus, a maximum value 805 of the appropriate IOPS of the Silver tier is 900 [IOPS/Vol].

The minimum value (before correction) 803 of the appropriate IOPS of the Gold tier is 2,000 [IOPS/Vol] and the maximum value 805 of the appropriate IOPS of the Silver tier is 900 [IOPS/Vol]. Owing to this, if an IOPS (one or each of the measured IOPS and the predicted IOPS) of an inappropriate LDEV is present in the non-overlapping range that is a gap between the Gold tier and the Silver tier (the range in which the appropriate IOPS is higher than 900 [IOPS/Vol] and lower than 2000 [IOPS/Vol]), the re-tiering candidate of the LDEV cannot be found. To address the problem, the proposal section 220 corrects the minimum value 803 (before correction) of the appropriate IOPS closest to a maximum value of the non-overlapping range to a minimum value (after correction) 806 of the appropriate IOPS (refer to a broken line elliptical frame 817). The appropriate range of the Gold tier is thereby extended and the non-overlapping range is eventually eliminated.

A gap between 20 [IOPS/Vol] that is a minimum value of an appropriate IOPS corresponding to the Bronze tier and 0 [IOPS/Vol] that is an example of the ideal minimum value of the appropriate IOPS is also a non-overlapping range. Since the Bronze tier is a lowest-order service tier, the proposal section 220 corrects the minimum value of the appropriate IOPS of the Bronze tier from 20 [IOPS/Vol] to 0 [IOPS/Vol] (refer to a broken line elliptical frame 87).

While a correction to raise the maximum value of the appropriate IOPS may be adopted, the correction to lower the minimum value of the appropriate IOPS is adopted in the present embodiment. Owing to this, it is possible to avoid a situation in which a risk such as over-performance tends to occur by raising the original maximum value of the appropriate IOPS.

Figure 9:
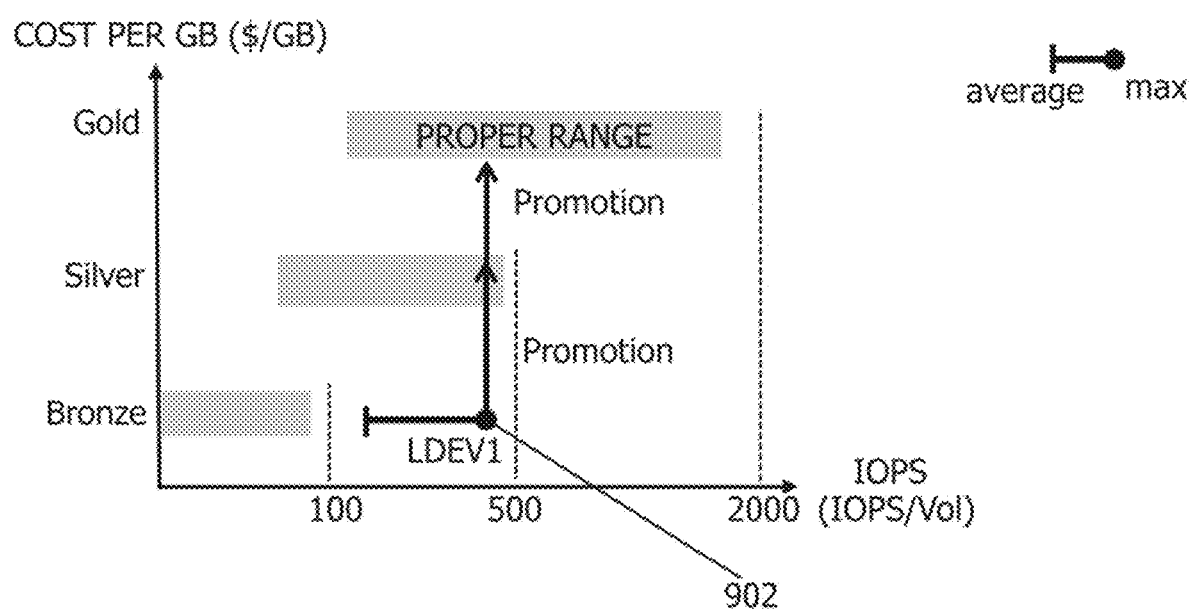
FIG. 9 is an explanatory diagram related to how to find a re-tiering candidate of an LDEV.

FIG. 9 is an explanatory diagram related to how to find the re-tiering candidate of the LDEV.

While an LDEV1 belongs to the Bronze tier, a maximum IOPS of the LDEV1 deviates from the appropriate range of the Bronze tier. Owing to this, the LDEV1 is an inappropriate LDEV.

The re-tiering candidate of the inappropriate LDEV1 is the service tier having the appropriate range overlapped by the maximum IOPS of the LDEV1. Specifically, it is required to make the LDEV1 Promotion to the Silver tier or Promotion to the Gold tier so that a maximum IOPS 902 of the LDEV1 belonging to the Bronze tier can be included in the appropriate range of any of the service tiers. In a case of presence of a plurality of re-tiering candidates as described above, the plurality of re-tiering candidates may be proposed or only the candidate satisfying a predetermined condition (for example, service tier at the highest level from that of the current service tier) out of the plurality of re-tiering candidates may be proposed.

Figure 10:
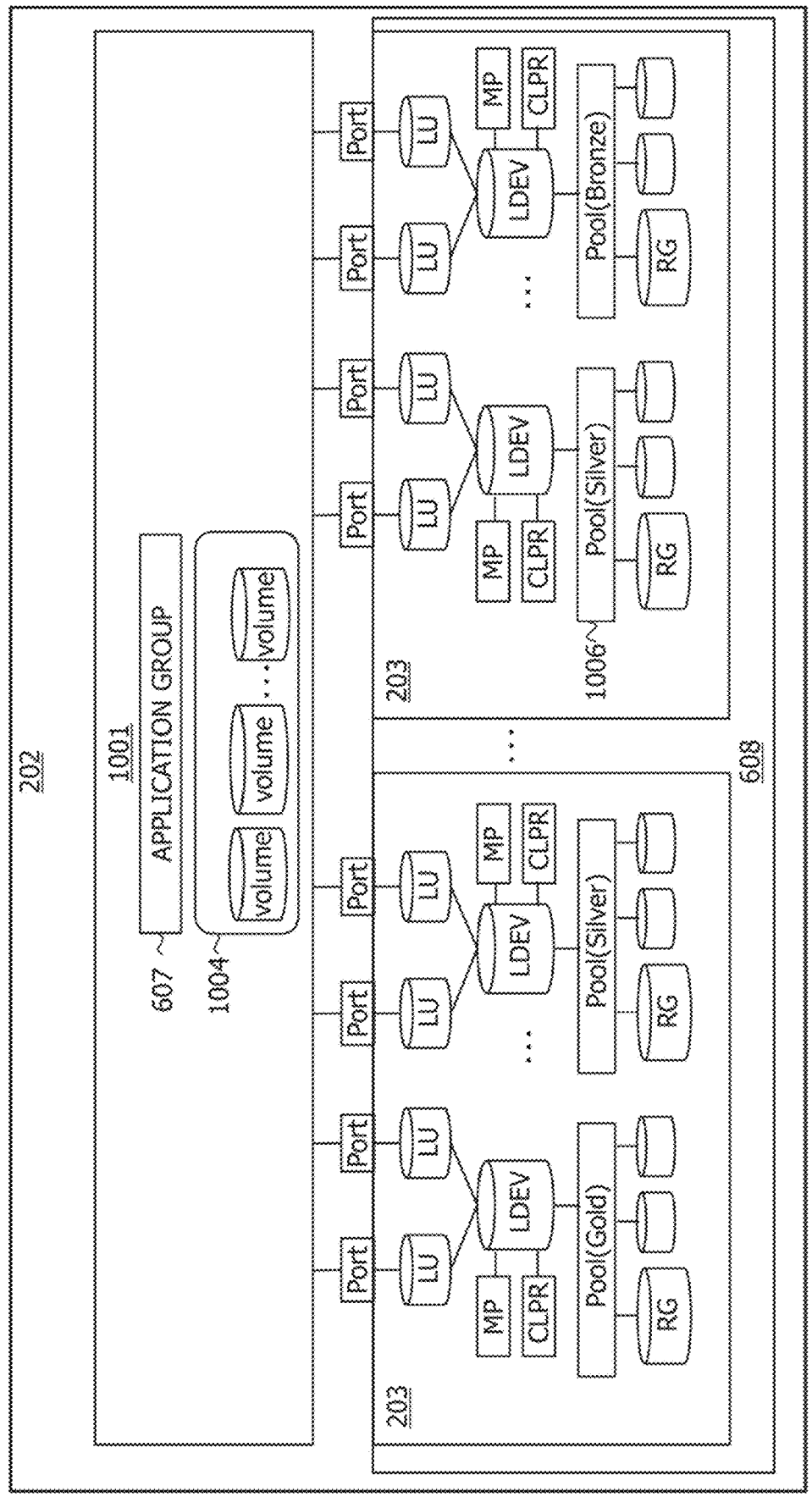
FIG. 10 depicts association of applications with LDEVs.

FIG. 10 depicts association of the applications with the LDEVs.

The classification section 216 in the analysis server 209 creates information about the association of the applications with the LDEVs.

For example, each data center 202 can be roughly classified into layers that are a server group 1001 and a storage group 608. The server group 1001 is a plurality of servers (or one server). The storage group 608 is a plurality of storage devices 203 (or one storage device 203).

The server group 1001 includes an application group 607 and a volume group 1004. The application group 607 is a plurality of applications. The volume group 1004 is a plurality of volumes generated by mounting the plurality of LDEVs. The plurality of volumes corresponding to the plurality of LDEVs allocated to the plurality of applications are recognized by the plurality of applications. When an application performs I/O of data to and from the volume recognized by the application, the data is I/O to and from the LDEV corresponding to the volume. Examples of the data stored in the volume include a transaction log, user data, and system management information.

The storage group 608 has a plurality of ports connected to the server group 1001, a plurality of LUs (Logical Units) associated with the plurality of ports, a plurality of LDEVs associated with the plurality of LUs, a plurality of pools to which the plurality of LDEVs belong, and a plurality of RGs (RAID groups) (or one RG) that form basis for the plurality of pools. For each pool, the pool belongs to any of the service tiers, and the LDEV based on the pool belongs to the same service tier as that to which the pool belongs. While the two LUs and the two ports are associated with one LDEV in an example of FIG. 10, this signifies that one path and an alternative path are present in the LDEV.

FIG. 11 is a configuration diagram of the Input Hive Tables 222 in the Hive Tables 214.

The Input Hive Tables 222 is configured with an AppLDEV association table 1101, a pool configuration table 1102, a service tier configuration table 1103, an LDEV configuration table 1104, and an LDEV performance table 1105. The "AppLDEV" means a set of an application and an LDEV allocated to the application. A country name and a city name may be an example of information indicating a geological location.

The AppLDEV association table 1101 retains information related to each AppLDEV. For example, the AppLDEV association table 1101 includes the following information per AppLDEV.

An application name 1111 that indicates a name of an application.
An LDEV name 1112 that indicates a name of an LDEV.
A storage name 1113 that indicates a name of the storage device 203 providing the LDEV.
A country name 1114 that indicates a name of a country where the storage device 203 is present.
A city name 1115 that indicates a name of a city where the storage device 203 is present.
A data center name 1116 that indicates a name of the data center 202 including the storage device 203.

The pool configuration table 1102 retains information related to each pool. For example, the pool configuration table 1102 includes the following information per pool.

A pool name 1121 that indicates a name of a pool.
A service tier name 1122 that indicates a name of a service tier (for example, a name of a level) to which the pool belongs.
An LDEV name 1123 that indicates a name of each LDEV belonging to the pool.
A storage name 1124 that indicates a name of the storage device 203 having the pool.
A country name 1125 that indicates a name of a country where the pool is present.
A city name 1126 that indicates a name of a city where the pool is present.
A data center name 1127 that indicates a name of the data center 202 where the pool is present.

The service tier configuration table 1103 retains information related to each service tier. For example, the service tier configuration table 1103 includes the following information per service tier.

A service tier name 1131 that indicates a name of a service tier (for example, a name of a level).
An agreement IOPS 1132 that indicates an agreement IOPS of the service tier.
An appropriate minimum usage rate 1133 that indicates a minimum value (a lower limit) of an appropriate IOPS usage rate of the service tier.
An appropriate maximum usage rate 1134 that indicates a maximum value (an upper limit) of the appropriate IOPS usage rate of the service tier.
An appropriate minimum IOPS 1135 that indicates a minimum value of an appropriate IOPS calculated using the agreement IOPS 1132 and the appropriate minimum usage rate 1133 of the service tier.
An appropriate maximum IOPS 1136 that indicates a maximum value of the appropriate IOPS calculated using the agreement IOPS 1132 and the appropriate maximum usage rate 1134 of the service tier.
A unit price 1137 that indicates a unit price of the service tier.

While the appropriate minimum usage rate 1133 (lower limit of an appropriate range of the maximum IOPS usage rate) and the appropriate maximum usage rate 1134 (upper limit of the appropriate range of the maximum IOPS usage rate) may depend on the individual service tier, the appropriate minimum usage rate 1133 and the appropriate maximum usage rate 1134 are common to a plurality of service tiers in the present embodiment. It is thereby possible to make the appropriate usage rate range common to all service tiers (for example, to set the appropriate usage rate range to a range from 20% to 90%). For example, if the appropriate minimum usage rate and the appropriate maximum usage rate common to the plurality of service tiers are described in a definition file within the CMDB 206, the judgement section 219 reads the definition file and sets the appropriate minimum usage rate 1133 and the appropriate maximum usage rate 1134 in the service tier configuration table 1103.

The LDEV configuration table 1104 retains information related to each LDEV. For example, the LDEV configuration table 1104 includes the following information per LDEV.

An LDEV name 1141 that indicates a name of an LDEV.
An allocated capacity 1142 that indicates an allocated capacity of the LDEV.
A used capacity 1143 that indicates a used capacity (consumed capacity) of the LDEV.

The LDEV performance table 1105 retains information related to each LDEV performance. For example, the LDEV performance table 1105 includes the following information per set of a point in time and an LDEV.

A date 1151 that indicates a point in time (any of past, current, and future points in time).
An LDEV name 1152 that indicates a name of the LDEV.
An IOPS 1153 that indicates an IOPS (one of or each of a measured IOPS and a predicted IOPS) obtained for the LDEV at the point in time.
Response time 1154 that indicates response time (one of or each of measured response time and predicted response time) obtained for the LDEV at the point in time.
A storage name 1155 that indicates a name of the storage device 203 having the LDEV.
A country name 1156 that indicates a name of a country where the storage device 203 is present.
A city name 1157 that indicates a name of a city where the storage device 203 is present.
A data center name 1158 that indicates a name of the data center 202 where the storage device 203 is present.

FIG. 12 is a configuration diagram of the Work Hive Tables 224 in the Hive Tables 214.

The Work Hive Tables 224 includes a learning model table 1201. A learning model (learned model for prediction) is present, for example, per AppTier.

The learning model table 1201 retains information related to each learning model. For example, the learning model table 1201 includes the following information per AppTier.

A learning model name 1211 that indicates a name of a learning model corresponding to an AppTier.

An application name 1212 that indicates a name of an application included in the AppTier.

A service tier name 1213 that indicates a name of a service tier included in the AppTier.

A storage name 1214 that indicates a name of the storage device 203 related to the service tier.

A country name 1215 that indicates a name of a country related to the service tier.

A city name 1216 that indicates a name of a city related to the service tier.

A data center name 1217 that indicates a name of the data center 202 where the service tier is present.

A learning start date 1218 that indicates a start data of creating the learning model.

A learning end date 1219 that indicates a completion date of creating the learning model.

A function formula 1220 that indicates a function formula f(t) as the learning model.

FIGS. 13A and 13B are configuration diagrams of the Output Hive Tables 225 in the Hive Tables 214.

The Output Hive Tables 225 is roughly classified into tables where data analysis results are stored and a part of tables (specifically, the service tier configuration table 1103) in the existing Input Hive Tables 222 necessary for display.

Examples of the tables storing the data analysis results include an application configuration table 1301, an application storage association table 1302, a measured performance table 1303, a predicted performance table 1304, a measured appropriate/inappropriate judgement table 1305, a predicted appropriate/inappropriate judgement table 1306, and an LDEV re-tiering table 1307.

The application configuration table 1301 retains information related to each application. For example, the application configuration table 1301 includes the following information per application.

An application name 1311 that indicates a name of an application.

A service tier name 1312 that indicates names of all service tiers in all AppTiers including the application.

A total capacity 1313 that indicates a total capacity which is a sum of capacities of all corresponding LDEVs corresponding to the application.

A total cost 1314 that indicates a total cost which is a sum of costs of all AppTiers including the application.

A storage name 1315 that indicates a name of the storage device 203 related to the application.

A country name 1316 that indicates a name of a country related to the application.

A city name 1317 that indicates a name of a city related to the application.

A data center name 1318 that indicates a name of the data center 202 related to the application.

The application storage association table 1302 retains information related to the association of an application with the storage device 203. For example, the application storage association table 1302 includes the following information per set of an application and a storage device 203.

A pool name 1321 that indicates a name of a pool owned by the storage device 203.

A service tier name 1322 that indicates a name of a service tier related to the application.

An application name 1323 that indicates a name of the application.

An LDEV name 1324 that indicates a name of each LDEV allocated to the application and provided by the storage device 203.

A capacity 1325 that indicates a capacity of each LDEV.

A cost 1326 that indicates a cost related to the application and obtained for each LDEV.

A storage name 1327 that indicates a name of the storage device 203 providing each LDEV allocated to the application.

A country name 1328 that indicates a name of a country where the storage device 203 is present.

A city name 1329 that indicates a name of a city where the storage device 203 is present.

A data center name 1330 that indicates a name of a data center 202 where the storage device 203 is present.

The measured performance table 1303 retains information related to each actually measured performance. For example, the measured performance table 1303 includes the following information per AppTier.

A date 1331 that indicates a date of each measured IOPS that forms the basis for a measured Total IOPS of each AppTier.

An application name 1332 that indicate a name of an application included in the AppTier.

A service tier name 1333 that indicates a name of a service tier included in the AppTier.

A Total IOPS 1334 that indicates the measured Total IOPS of the AppTier.

A storage name 1335 that indicates a name of the storage device 203 related to the AppTier.

A country name 1336 that indicates a name of a country related to the AppTier.

A city name 1337 that indicates a name of a city related to the AppTier.

A data center name 1338 that indicates a name of the data center 202 related to the AppTier.

The predicted performance table 1304 retains information related to each predicted performance. For example, the predicted performance table 1304 includes the following information per AppTier.

A date 1341 that indicates a date of each predicted IOPS that forms the basis for a predicted Total IOPS of each AppTier.

An application name 1342 that indicate a name of an application included in the AppTier.

A service tier name 1343 that indicates a name of a service tier included in the AppTier.

A Total IOPS 1344 that indicates the predicted Total IOPS of the AppTier.

A storage name 1345 that indicates a name of the storage device 203 related to the AppTier.

A country name 1346 that indicates a name of a country related to the AppTier.

A city name 1347 that indicates a name of a city related to the AppTier.

A data center name 1348 that indicates a name of the data center 202 related to the AppTier.

The measured appropriate/inappropriate judgement table 1305 retains information related to an appropriate/inappropriate judgement based on a maximum measured IOPS usage rate of each AppTier. For example, the measured appropriate/inappropriate judgement table 1305 includes the following information per AppTier.

A date 1351 that indicates a date of an appropriate/inappropriate judgement.

An application name 1352 that indicates a name of an application included in the AppTier.

A service tier name 1353 that indicates a name of a service tier included in the AppTier.

A maximum measured usage rate 1354 that indicates a maximum measured IOPS usage rate (a ratio of a maximum measured Total IOPS to a Total agreement IOPS) of the AppTier.

An average measured usage rate 1355 that indicates an average measured IOPS usage rate (a ratio of an average measured Total IOPS to the Total agreement IOPS) of the AppTier.

An appropriate/inappropriate judgement 1356 that indicates whether the maximum measured Total IOPS of the AppTier is appropriate (whether the maximum measured IOPS usage rate overlaps an appropriate usage rate range).

A storage name 1357 that indicates a name of the storage device 203 related to the AppTier.

A country name 1358 that indicates a name of a country related to the AppTier.

A city name 1359 that indicates a name of a city related to the AppTier.

A data center name 1360 that indicates a name of the data center 202 related to the AppTier.

The predicted appropriate/inappropriate judgement table 1306 remains information related to an appropriate/inappropriate judgement based on a maximum predicted IOPS usage rate of each AppTier. For example, the predicted appropriate/inappropriate judgement table 1306 includes the following information per AppTier.

A date 1361 that indicates a date of an appropriate/inappropriate judgement.

An application name 1362 that indicates a name of an application included in the AppTier.

A service tier name 1363 that indicates a name of a service tier included in the AppTier.

A maximum predicted usage rate 1364 that indicates a maximum predicted IOPS usage rate (a ratio of a maximum predicted Total IOPS to the Total agreement IOPS) of the AppTier.

An average predicted usage rate 1365 that indicates an average predicted IOPS usage rate (a ratio of an average predicted Total IOPS to the Total agreement IOPS) of the AppTier.

An appropriate/inappropriate judgement 1366 that indicates whether the maximum predicted Total IOPS of the AppTier is appropriate (whether the maximum predicted IOPS usage rate overlaps the appropriate usage rate range).

A storage name 1367 that indicates a name of the storage device 203 related to the AppTier.

A country name 1368 that indicates a name of a country related to the AppTier.

A city name 1369 that indicates a name of a city related to the AppTier.

A data center name 1370 that indicates a name of a data center 202 related to the AppTier.

The LDEV re-tiering table 1307 retains information related to re-tiering of each LDEV. For example, the LDEV re-tiering table 1307 includes the following information per LDEV.

A date 1371 that indicates a date of an appropriate/inappropriate judgement.

An application name 1372 that indicates a name of an application to which the LDEV is allocated.

A service tier name 1373 that indicates a name of a service tier to which the LDEV belongs.

An LDEV name 1374 that indicates a name of the LDEV.

A maximum IOPS 1375 that indicates a maximum IOPS (for example, a maximum measured IOPS) of the LDEV.

An average IOPS 1376 that indicates an average IOPS (for example, an average measured IOPS) of the LDEV.

A maximum usage rate 1377 that indicates a maximum IOPS usage rate (for example, a ratio of the maximum measured IOPS or a maximum predicted IOPS to an agreement IOPS) of the AppTier.

An average usage rate 1378 that indicates an average IOPS usage rate (for example, ratio of the average measured IOPS or an average predicted IOPS to the agreement IOPS) of the AppTier.

An appropriate/inappropriate judgement 1379 that indicates whether the LDEV is appropriate.

A re-tiering type 1380 that indicates a re-tiering type (Promotion, Demotion, or None (not re-tiering)) of the LDEV.

A destination service tier name 1381 that indicates a name of a service tier as a re-tiering candidate of the LDEV.

A storage name 1382 that indicates a name of the storage device 203 providing the LDEV.

A country name 1383 that indicates a name of a country where the storage device 203 is present.

A city name 1384 that indicates a name of a city where the storage device 203 is present.

A data center name 1385 that indicates a name of the data center 202 where the storage device 203 is present.

The service tier configuration table 1103 in the existing Input Hive Tables 222 may be stored in the Output Hive Tables 309 and displayed on the dashboard of the BA 213 without being processed.

Figure 14:
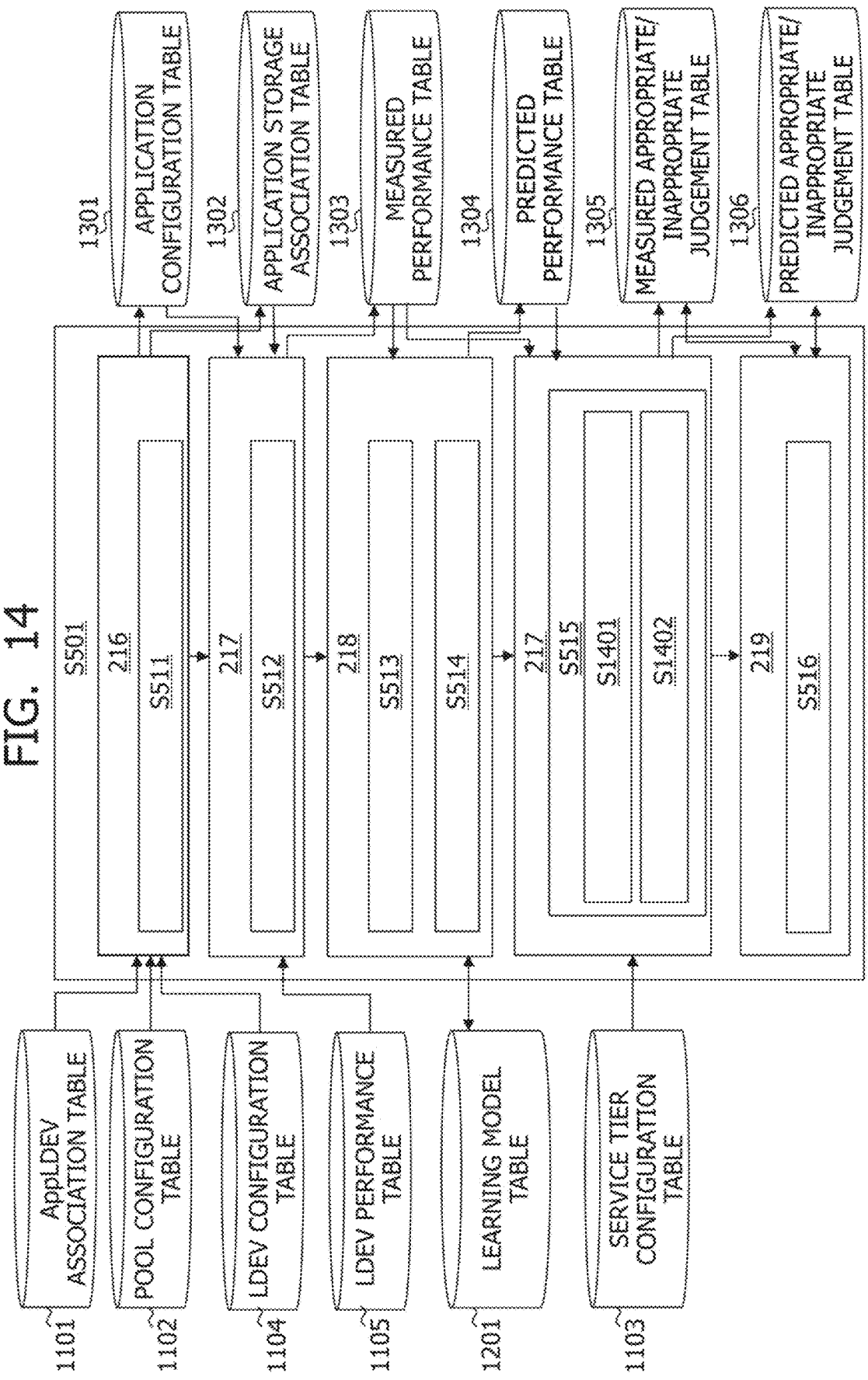
FIG. 14 depicts a detailed flow of S501 of FIG. 5.

FIG. 14 depicts a detailed flow of S501 of FIG. 5.

The AppLDEV association table 1101, the pool configuration table 1102, and the LDEV configuration table 1104 are input to the classification section 216, and the classification section 216 performs classification in S511 and stores a result in the application configuration table 1301 and the application storage association table 1302.

The LDEV performance table 1105, the application configuration table 1301, and the application storage association table 1302 are input to the aggregation section 217, and the aggregation section 217 executes resource performance aggregation per AppTier in S512 and stores a result in the measured performance table 1303.

The measured performance table 1303 is input to the prediction section 218, and the prediction section 218 executes a learning model generation process in S513 and stores a result in the learning model table 1201. Next, the learning model table 1201 is input to the prediction section 218, and the prediction section 218 executes resource performance prediction in S514 and stores a result in the predicted performance table 1304.

The aggregation section 217 executes a process in S515. Specifically, the service tier configuration table 1103 and the measured performance table 1303 are input to the aggregation section 217, and the aggregation section 217 executes performance aggregation per AppTier during the analysis period (past) in S1401 and stores a result in the measured appropriate/inappropriate judgement table 1305. Next, the service tier configuration table 1103 and the predicted performance table 1304 are input to the aggregation section 217, and the aggregation section 217 executes performance aggregation per AppTier during the analysis period (future)

in S1402 and stores a result in the predicted appropriate/inappropriate judgement table 1306.

The measured appropriate/inappropriate judgement table 1305 and the predicted appropriate/inappropriate judgement table 1306 are input to the judgement section 219, and the judgement section 219 executes appropriate/inappropriate judgement support per AppTier in S516 and adds a result to the tables 1305 and 1306.

Figure 15:
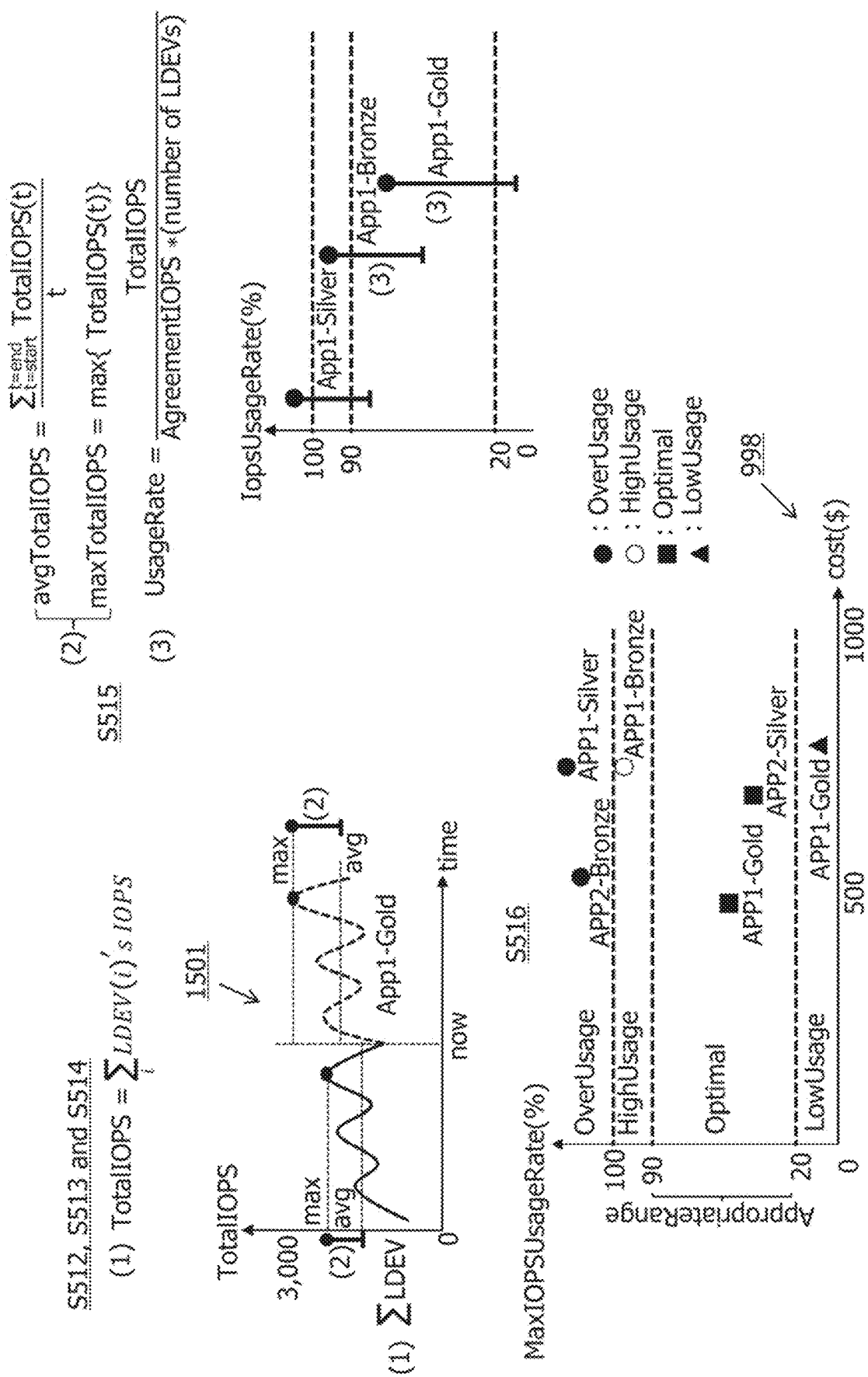
FIG. 15 is an explanatory diagram related to an example of processes depicted in FIG. 14.

FIG. 15 is an explanatory diagram related to an example of processes depicted in FIG. 14.

In S512 to S514, a time-series Total IOPS is calculated per AppTier by applying Equation (1) depicted in FIG. 15 to each of a plurality of points in time during the analysis periods related to the past, the current time, and the future. For each AppTier, the Total IOPS at each point in time is a total of the IOPS 1153 associated with the date 1151 corresponding to the point in time. Reference character 1501 denotes a time-series measured Total IOPS and a time-series predicted Total IOPS for App1-Gold.

In S515, an average Total IOPS (avgTotalIOPS) and a maximum Total IOPS (maxTotalIOPS) are calculated by Equations (2). The average Total IOPS is an average value of a plurality of Total IOPS previously calculated for the analysis period. The maximum Total IOPS is a maximum value of a plurality of Total IOPS previously calculated for the analysis period.

In S515, an IOPS usage rate (UsageRate) is further calculated by Equation (3). The IOPS usage rate is the ratio of the Total IOPS (value calculated by Equations (2)) to the Total agreement IOPS. The Total agreement IOPS is a product between the agreement IOPS 1132 and the number of corresponding LDEVs. The number of corresponding LDEVs is the number of LDEV names identified from the Input Hive Tables 222 with the application name and service tier name belonging to the AppTier as keys.

In S516, the appropriate/inappropriate judgement support is executed. Specifically, the service tier map 998 described above is displayed. In a case in which the IOPS usage rate is equal to or higher than the appropriate minimum usage rate 1133 and equal to or lower than the appropriate maximum usage rate 1134, "appropriate" is stored as the appropriate/inappropriate judgement 1356 or 1366; otherwise, "inappropriate" is stored as the appropriate/inappropriate judgement 1356 or 1366. It is noted that in a case in which the IOPS usage rate is equal to or higher than the appropriate minimum usage rate 1133 and not equal to or lower than the appropriate maximum usage rate 1134, the state according to the IOPS usage rate, for example, "OverUsage," "HighUsage," or "LowUsage" may be stored as the appropriate/inappropriate judgement 1356 or 1366.

Figure 16:
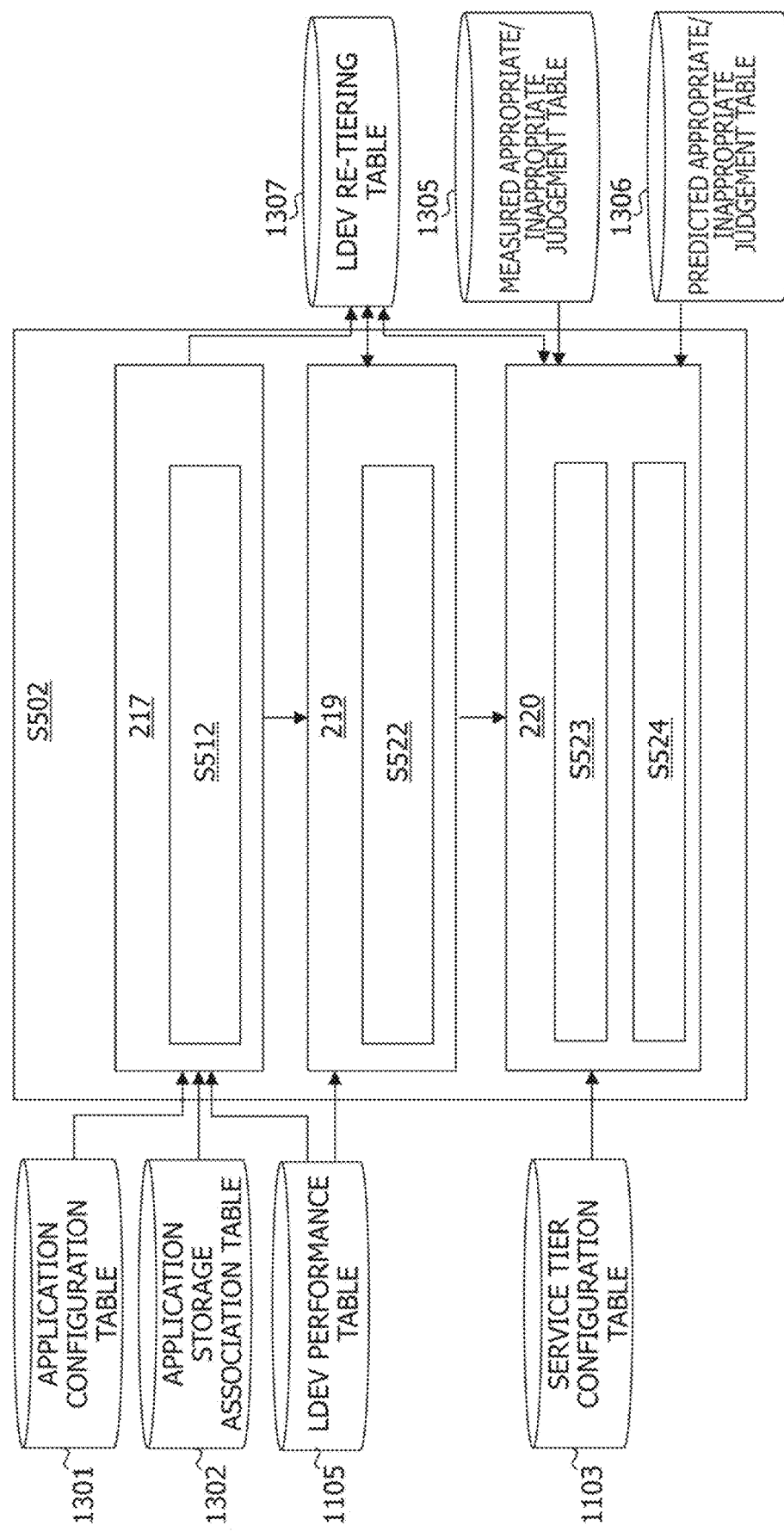
FIG. 16 depicts a detailed flow of S501 of FIG. 5.

FIG. 16 depicts a detailed flow of S502 of FIG. 5.

The application configuration table 1301, the application storage association table 1302, and the LDEV performance table 1105 are input to the aggregation section 217, and the aggregation section 217 executes performance aggregation per AppTier during the (past) analysis period in S521 and stores a result in the LDEV re-tiering table 1307.

The LDEV performance table 1105 and the LDEV re-tiering table 1307 are input to the judgement section 219, and the judgement section 219 executes appropriate/inappropriate judgement of each LDEV in S522 and stores a result in the LDEV re-tiering table 1307.

The service tier configuration table 1103, the measured appropriate/inappropriate judgement table 1305, the predicted appropriate/inappropriate judgement table 1306, and the LDEV re-tiering table 1307 are input to the proposal section 220, and the proposal section 220 sets the appropriate range of each service tier in S523, identifies the re-tiering candidate of an inappropriate LDEV in S524, and stores a result in the LDEV re-tiering table 1307.

Figure 17:
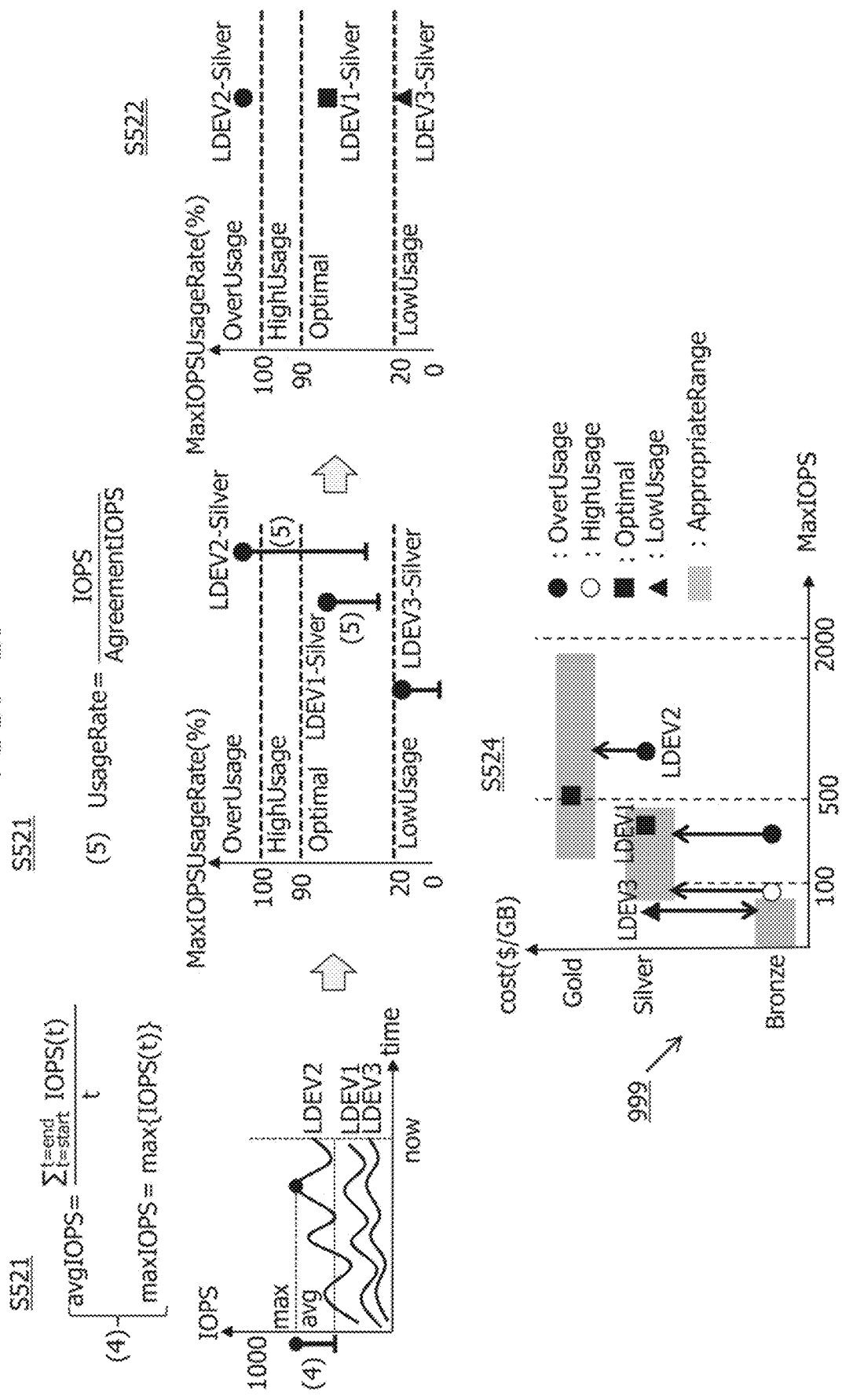
FIG. 17 is an explanatory diagram related to an example of processes depicted in FIG. 16.

FIG. 17 is an explanatory diagram related to an example of processes depicted in FIG. 16.

In S521, an average IOPS (avgIOPS) and a maximum IOPS (maxIOPS) are calculated for each LDEV allocated to the intended application that is the application included in, for example, the customer's selected AppTier by Equations (4). For each LDEV, the average IOPS is an average value of a plurality of IOPS 1153 corresponding to a plurality of dates 1151 belonging to the analysis period. For each LDEV, the maximum IOPS is a maximum value of the plurality of IOPS 1153 corresponding to the plurality of dates 1151 belonging to the analysis period.

In S521, for each LDEV, an average IOPS usage rate (a ratio of the calculated average IOPS to the agreement IOPS 1132) and a maximum IOPS usage rate (a ratio of the calculated maximum IOPS to the agreement IOPS 1132) are further calculated by Equation (5).

In S522, for each LDEV, in a case in which the maximum IOPS usage rate is equal to or higher than the appropriate minimum usage rate 1133 and equal to or lower than the appropriate maximum usage rate 1134, "appropriate" is stored as the appropriate/inappropriate judgement 1379; otherwise, "inappropriate" is stored as the appropriate/inappropriate judgement 1379. It is noted that in a case in which the maximum IOPS usage rate is equal to or higher than the appropriate minimum usage rate 1133 and not equal to or lower than the appropriate maximum usage rate 1134, the state according to the maximum IOPS usage rate, for example, "OverUsage," "HighUsage," or "LowUsage" may be stored as the appropriate/inappropriate judgement 1379.

In S523, for each LDEV, the appropriate range of the service tier to which the LDEV belongs is set. The appropriate minimum IOPS 1135 that is the lower limit of the appropriate range is a value according to the agreement IOPS 1132 and according to the appropriate minimum usage rate 1133. The appropriate maximum IOPS 1136 that is the upper limit of the appropriate range is a value according to the agreement IOPS 1132 and according to the appropriate maximum usage rate 1134.

In S524, the re-tiering candidate of the inappropriate LDEV is identified. For example, the re-tiering candidate map 999 is displayed. On this map, the display mode (for example, shape and color) of the display object of each inappropriate LDEV depends on the appropriate/inappropriate judgement 1379 corresponding to the LDEV (for example, any of "OverUsage," "HighUsage," and "LowUsage").

Figure 18A:
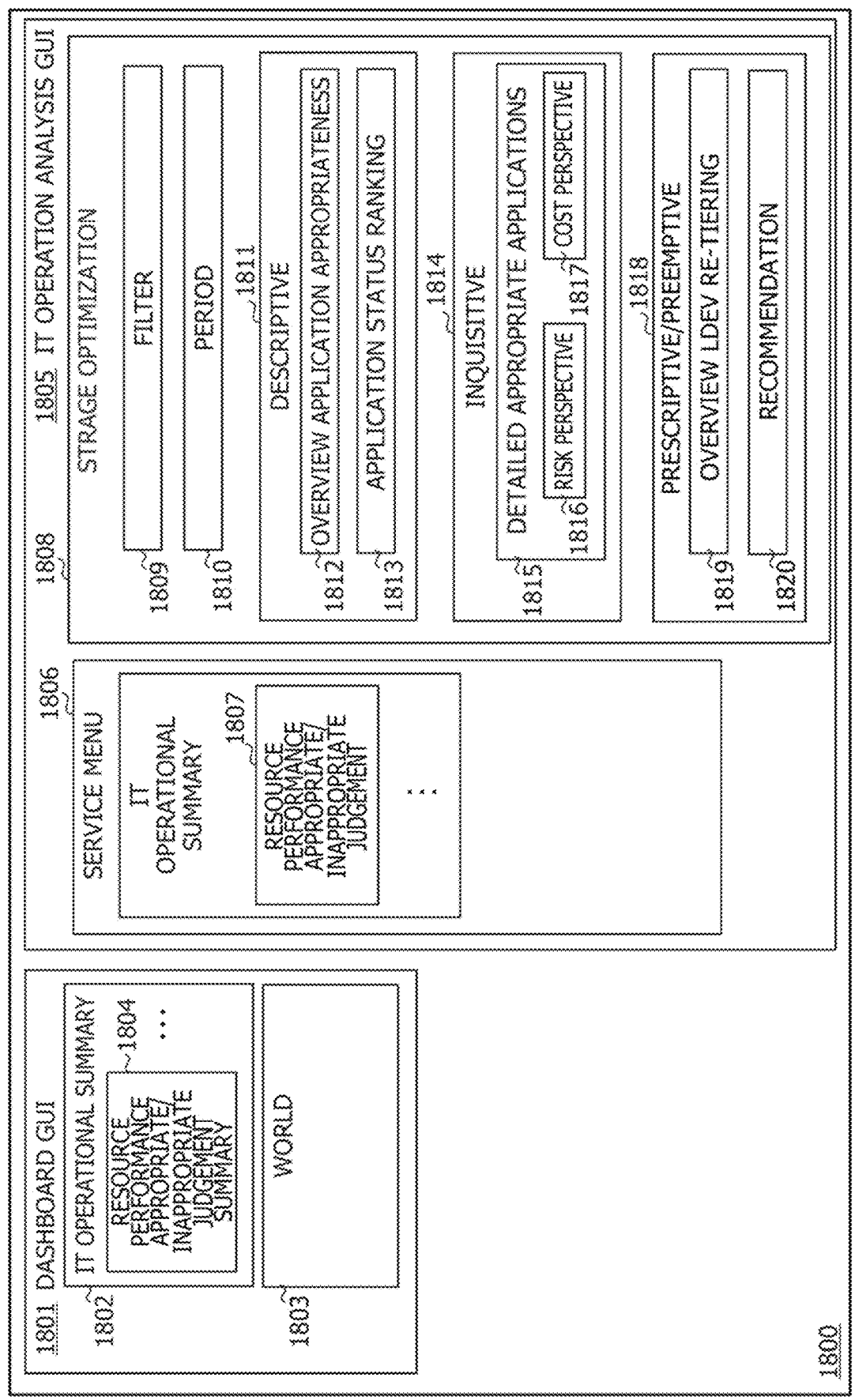
FIG. 18A depicts an optimization support GUI.

FIG. 18A depicts a configuration of an optimization support GUI (Graphical User Interface). In the following description, a "GUI portion" may be a GUI component such as a button or a pull-down menu or may be information such as text or a graph. At least part of the information may include a GUI component through which an input is received.

An optimization support GUI 1800 is displayed by, for example, the judgement section 219. Part of GUI portions in the optimization support GUI 1800 are displayed by the proposal section 220.

The optimization support GUI 1800 has GUI portions such as a dashboard GUI 1801 and an IT operation analysis GUI 1805 on which information as a result of an operation on the dashboard GUI 1801 is displayed.

The dashboard GUI 1801 has GUI portions such as an IT operational summary GUI portion 1802 and a world map GUI portion 1803. A GUI portion such as a resource performance appropriate/inappropriate judgement summary GUI portion 1804 is placed in the IT operational summary GUI portion 1802. Not only one or more geological locations corresponding to the customer but also a resource performance situation (for example, information indicating what sort of the inappropriate AppTier is present) at the one or more geological locations may be displayed on the world map GUI portion 1803.

The IT operation analysis GUI 1805 has GUI portions such as a service menu GUI portion 1806 and a resource performance appropriate/inappropriate judgement GUI "storage optimization" 1808.

The service menu GUI portion 1806 includes various menus related to IT operation, where a GUI portion such as a resource performance appropriate/inappropriate judgement GUI portion 1807 is present.

The resource performance appropriate/inappropriate judgement GUI "storage optimization" 1808 has GUI portions such as a filter GUI portion 1809, a period GUI portion 1810, a situation grasping GUI portion "descriptive" 1811, a detailed analysis GUI portion "inquisitive" 1814, and a measures GUI portion "prescriptive/preemptive" 1818.

The customer can narrow down information to be displayed by further designating a region and an object to be managed as filter conditions from a country displayed on the dashboard GUI 1801 using the filter GUI portion 1809 (narrow down information by, for example, designating the objects to be managed such as the country, the city, the data center, and the service tier). In other words, designation of the filter conditions is received through the filter GUI portion 1809. Detailed information related to the objects to be managed designated as the filter conditions is displayed in the other GUI portion (for example, the situation grasping GUI portion "descriptive" 1811).

Designation of a point in time from the current time to the past is received through the period GUI portion 1810. A period from the designated point in time to the current time is a display target period (for example, analysis period). Detailed information corresponding to the display target period is displayed in the other GUI portion (for example, the situation grasping GUI portion "descriptive" 1811).

On the situation grasping GUI portion "descriptive" 1811, a resource performance allocation situation (application) GUI portion "overview application appropriateness" 1812 that is a GUI portion indicating a situation of application group resource performance allocation, and a ranking GUI portion "application status ranking" 1813 that is a GUI portion indicating ranking of applications for which an appropriate/inappropriate judgement is to be executed are displayed.

On the detailed analysis GUI portion "inquisitive" 1814, an application situation GUI portion "detailed appropriate applications" 1815 that is a GUI portion indicating a situation of resource performance allocation for a specific application (application included in, for example, the selected AppTier) is displayed. The application situation GUI portion "detailed appropriate applications" 1815 includes a risk viewpoint GUI portion "risk perspective" 1816 that is a GUI portion indicating a situation according to a performance risk viewpoint and a cost viewpoint GUI portion "cost perspective" 1817 that is a GUI portion indicating a situation according to a resource cost viewpoint.

The measures GUI portion "prescriptive/preemptive" 1818 includes a resource performance situation (LDEV) GUI portion "overview LDEV re-tiering" 1819 that is a GUI portion indicating a situation of resource performance allocation for the LDEV corresponding to the specific application, and a proposal details GUI portion "recommendation" 1820 that is a GUI portion indicating details related to the proposal of the re-tiering candidate of the LDEV.

Figure 18B:
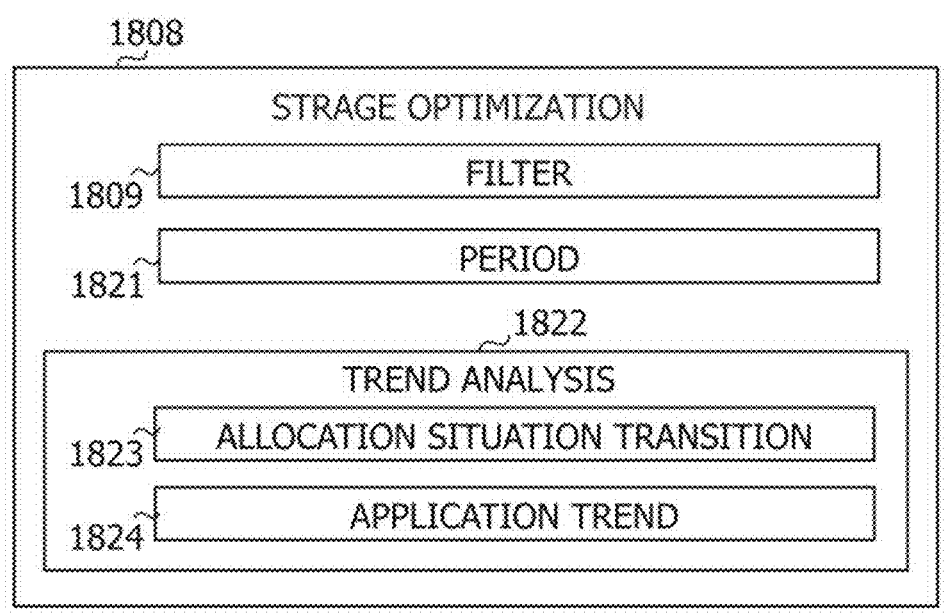
FIG. 18B depicts a modification of a resource performance appropriate/inappropriate judgement GUI.

FIG. 18B depicts one modification of the resource performance appropriate/inappropriate judgement GUI "storage optimization" 1808.

A GUI portion that is a period GUI portion 1821 is placed as an alternative to or in addition to the period GUI portion 1810. In addition, a GUI portion that is a tendency grasping GUI portion "trend analysis" 1822 is placed.

Through the period GUI portion 1821, designation of a point in time from the current time to the future is received in addition to the point in time from the current time to the past. Owing to this, in a case of using the period GUI portion 1821, a display target period is a period from the designated past point in time to the designated future point in time through the current time. Information about the display target period, that is, detailed information such as time-series variation tendency from past information based on measured values to future information based on prediction is displayed on the tendency grasping GUI portion "trend analysis" 1822.

On the tendency grasping GUI portion "trend analysis" 1822, an allocation situation transition GUI portion 1823 that is a GUI portion indicating a transition of the situation of the resource performance allocation of the application group, and an application trend GUI portion 1824 that is a GUI portion indicating a trend of applications for which the appropriate/inappropriate judgement is to be executed are displayed.

Figure 19:
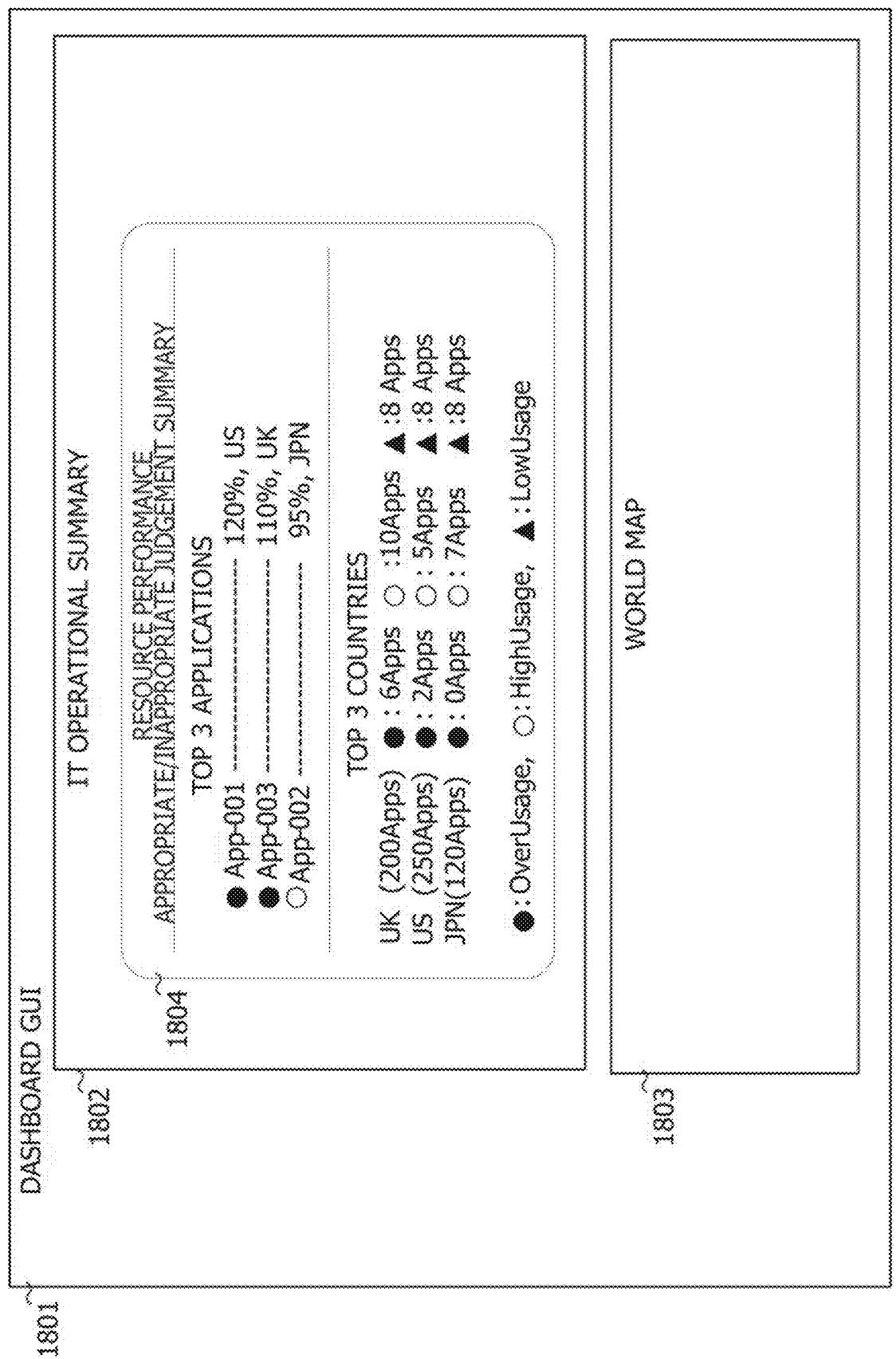
FIG. 19 depicts an example of display of a resource performance appropriate/inappropriate judgement summary in a dashboard GUI.

FIG. 19 depicts an example of display of the resource performance appropriate/inappropriate judgement summary 1804 in the dashboard GUI 1801.

On the dashboard GUI 1801, the IT operational summary GUI portion 1802 displays information related to display on the world map GUI portion 1803. When a specific country is selected from the world map GUI portion 1803, the judgement section 219 displays information about an IT operational summary of the country (predetermined types of information among the information acquired from the Hive Tables 214). Without country selection, information about the IT operational summaries of all countries is displayed.

On the resource performance appropriate/inappropriate judgement summary 1804, top 3 inappropriate applications and top 3 countries having many inappropriate applications are displayed. It is noted that the "inappropriate application" is an application included in an inappropriate AppTier. Ranks of the inappropriate applications may depend on in what inappropriate state (OverUsage, HighUsage, or LowUsage) each application is. As for each AppTier, an inappropriate state can be confirmed from the appropriate/inappropriate judgement 1356 or 1366.

Figure 20:
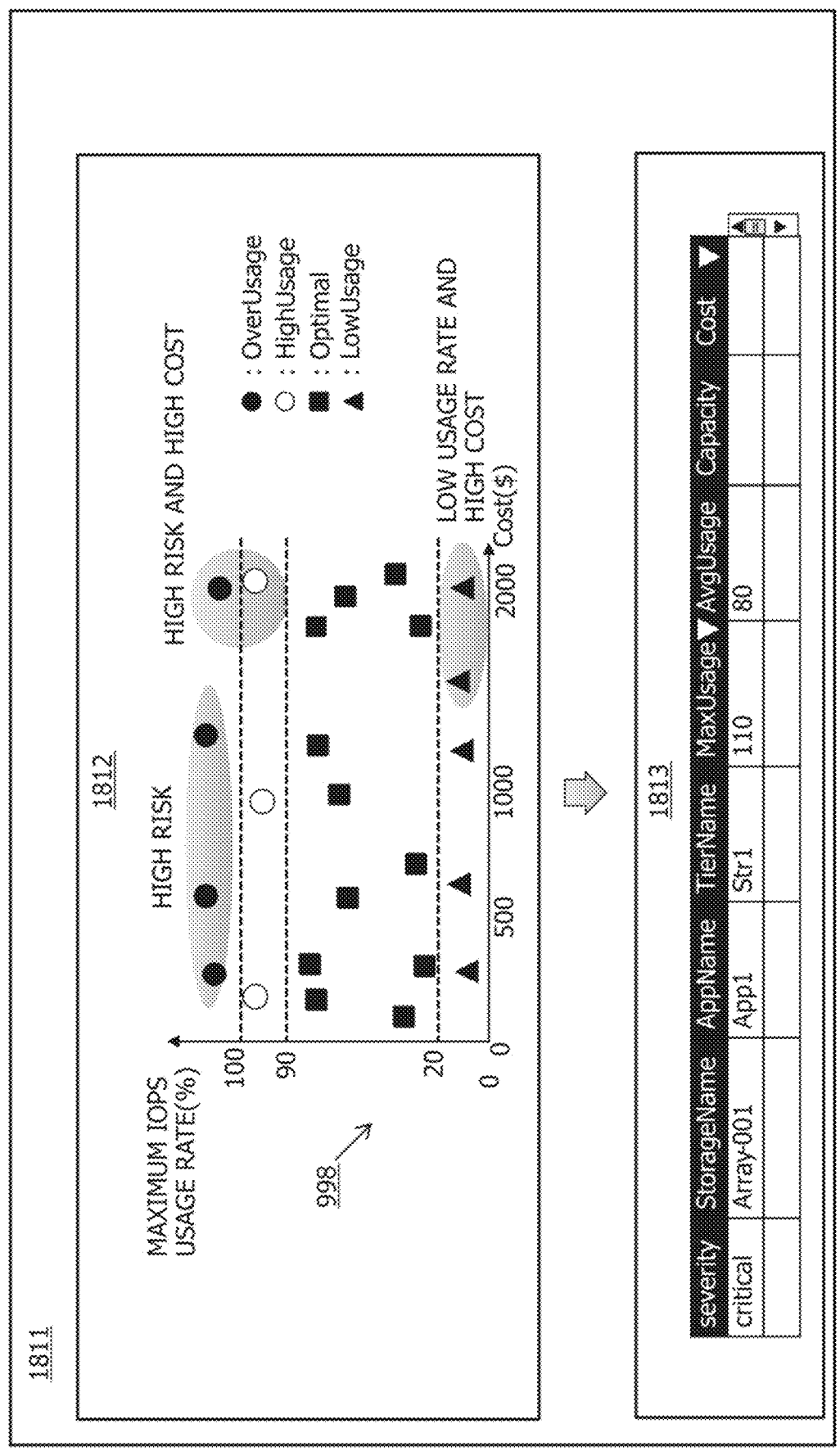
FIG. 20 depicts an example of display of situation grasping.

FIG. 20 depicts an example of display of the situation grasping GUI portion "descriptive" 1811.

The situation grasping GUI portion "descriptive" 1811 has the GUI portions such as the allocation situation (application) GUI portion "overview application appropriateness" 1812 and the ranking GUI portion "application status ranking" 1813.

The allocation situation (application) GUI portion "overview application appropriateness" 1812 includes the service tier map 998. In other words, the costs and the maximum IOPS usage rates when the LDEVs allocated to each application are aggregated per service tier are displayed. On the service tier map 998 (which is the graph as the two-dimensional orthogonal coordinate system with the vertical axis representing the maximum IOPS usage rate and the horizontal axis representing the cost), an AppTier at a more upward position has a higher risk (in other words, an AppTier at a more downward position has a lower risk) and an AppTier at a more rightward position has a higher cost (in other words, an AppTier at a more leftward position has a lower cost). In other words, confirming where the display object of any of the AppTiers is placed on the service tier map 998 enables the customer to grasp that the application included in the AppTier is an inappropriate application and grasp characteristics of the inappropriate application.

Through the allocation situation (application) GUI portion "overview application appropriateness" 1812, designation of an entire region or a partial region of the service tier map 998 can be received from the customer. The AppTiers corresponding to the display objects included in the designated region are an example of selected AppTiers.

On the ranking GUI portion "application status ranking" 1813, a list of detailed information related to the selected AppTiers is displayed. On the ranking GUI portion "application status ranking" 1813, the AppTiers can be displayed in such a manner as to be sorted in descending order of the maximum IOPS usage rates or the costs. The customer can select one AppTier, that is, one application included in the AppTier from the ranking GUI portion "application status ranking" 1813.

As described above, at least one of the following processes, for example, may be executed in the present embodiment.

The judgement section 219 displays an AppTier situation summary for a plurality of objects to be managed belonging to a designated type of objects to be managed from a plurality of types of hierarchized objects to be managed (for example, a country type, a city type, and a data center type). The AppTier situation summary corresponds to a summary to the effect that how many AppTiers are present in what inappropriate state (OverUsage, HighUsage, or LowUsage). The customer can grasp the situation for the resource performance allocation and execute optimization in such a manner as to drill down the situation from an arbitrary type of objects to be managed. It is noted that for each AppTier, the customer can grasp the inappropriate state from the appropriate/inappropriate judgement 1356 or 1366.

The judgement section 219 judges top N (where N is a natural number) applications for each of which it is desired to determine whether the performance is appropriate on the basis of at least one of the maximum IOPS usage rate and the cost of each of all of AppTiers belonging to the designated region on the service tier map 998, and displays detailed information related to the determined N applications as, for example, the ranking on the ranking GUI portion "application status ranking" 1813. In this way, designating a region found by taking a bird's-eye view of the service tier map 998 enables the customer to grasp details about the applications belonging to the region and to determine whether to perform more detailed analysis.

Figure 21:
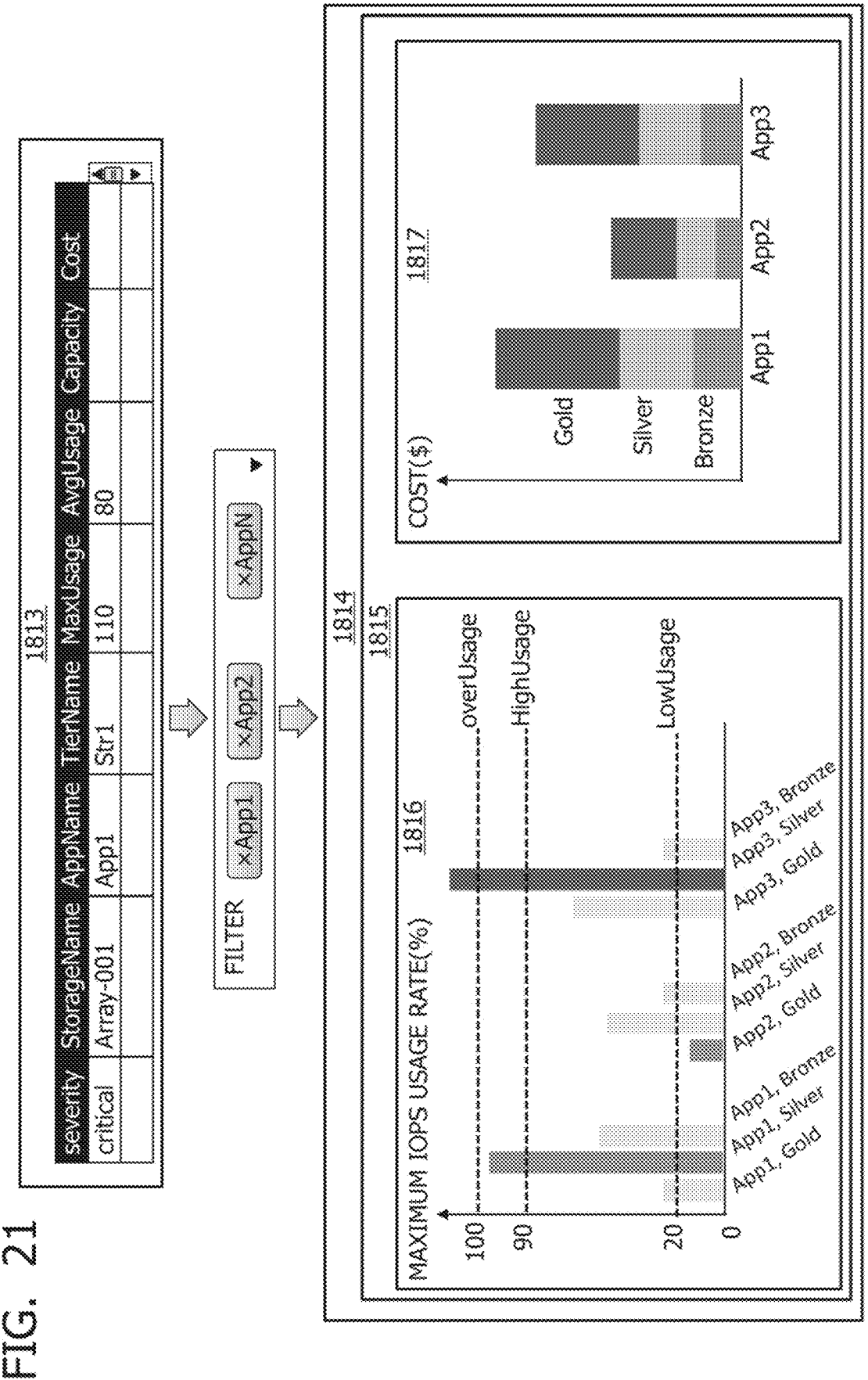
FIG. 21 depicts an example of display of detailed analysis.

FIG. 21 depicts an example of display of the detailed analysis GUI portion "inquisitive" 1814.

For the application selected by the customer from the ranking GUI portion "application status ranking" 1813 (application on which the customer desires to perform the detailed analysis), that is, the specific application that is the application narrowed down by filtering among a plurality of applications displayed on the ranking GUI portion "application status ranking" 1813, detailed information is displayed on the application situation GUI portion "detailed appropriate applications" 1815 in the detailed analysis GUI portion "inquisitive" 1814. Specifically, the judgement section 219, for example, displays at least one of the risk viewpoint GUI portion "risk perspective" 1816 and the cost viewpoint GUI portion "cost perspective" 1817 on the basis of at least part of the Hive Tables 214 and the Output Tables 309 for each of M (where M is a natural number equal to or smaller than N) applications out of the N applications described above.

The risk viewpoint GUI portion "risk perspective" 1816 includes a performance details graph. The performance details graph is a graph that indicates, for each application (an example of each of the M applications) selected from the ranking GUI portion "application status ranking" 1813, the performance of each service tier configuring, together with the application, an AppTier. In other words, the performance details graph displays a performance risk of each service tier per application.

The cost viewpoint GUI portion "cost perspective" 1817 includes a cost details graph. The cost details graph is a graph that indicates, for each application (an example of each of the M applications) selected from the ranking GUI portion "application status ranking" 1813, the cost of each service tier configuring, together with the application, an AppTier. In other words, the cost details graph displays a breakdown of the cost per application.

Viewing the risk viewpoint GUI portion "risk perspective" 1816 and the cost viewpoint GUI portion "cost perspective" 1817 enables the customer to grasp the balance between the maximum IOPS usage rate and the cost per service tier configuring, together with each of the selected applications, an AppTier.

The application judged by the customer to be inappropriate is selected via the detailed analysis GUI portion "inquisitive" 1814 (or the other GUI portion).

Figure 22:
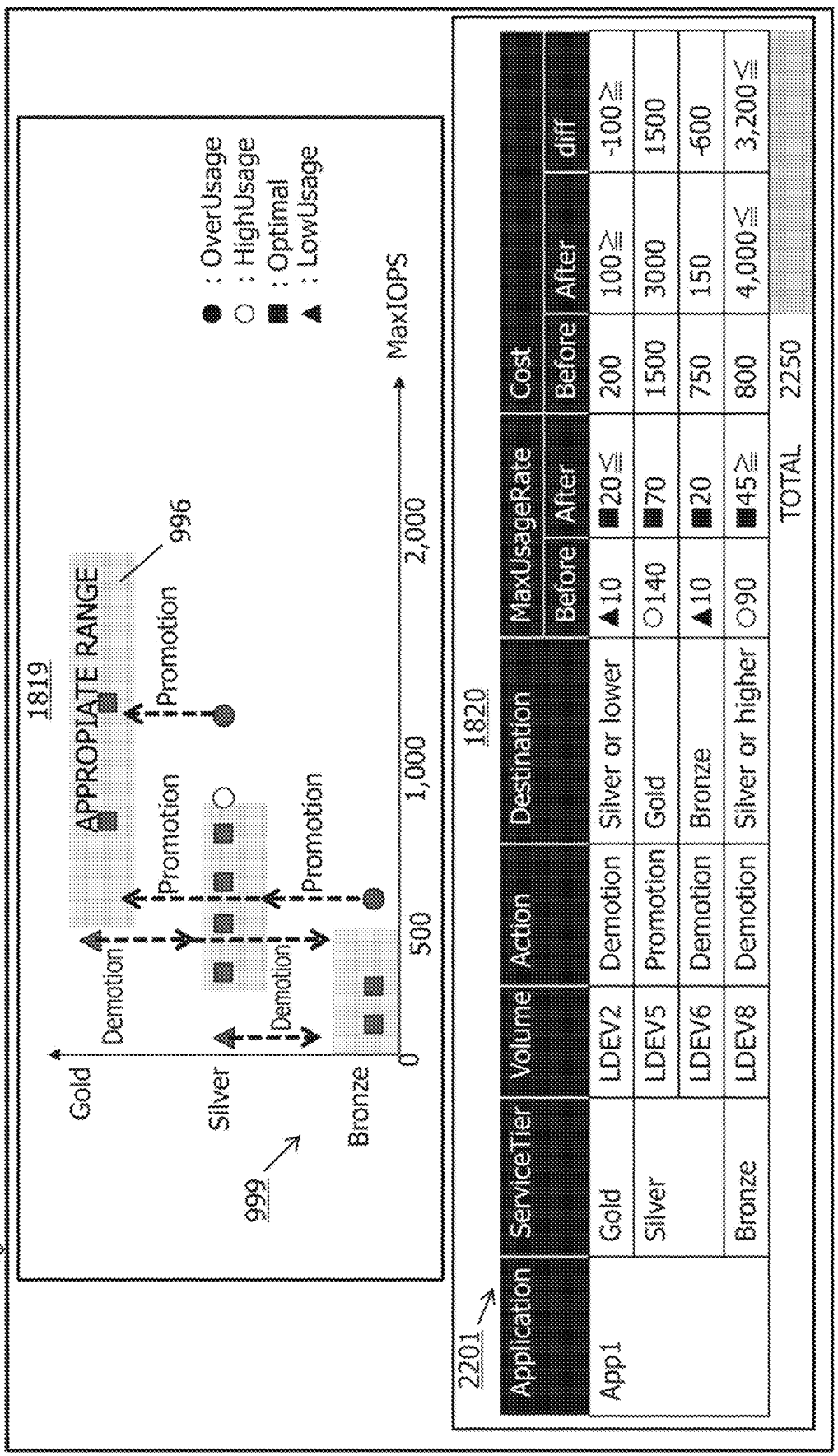
FIG. 22 depicts an example of display of measures.

FIG. 22 depicts an example of display of the measures GUI portion "prescriptive/preemptive" 1818.

On the measures GUI portion "prescriptive/preemptive" 1818, the allocation situation (LDEV) GUI portion "overview LDEV re-tiering" 1819 and the proposal details GUI portion "recommendation" 1820 are displayed for the application judged to be inappropriate and selected.

The allocation situation (LDEV) GUI portion "overview LDEV re-tiering" 1819 includes the re-tiering candidate map 999 described above. The re-tiering candidate map 999 displays, per service tier corresponding to the selected application, the appropriate range zone 996 that indicates the appropriate range of the service tier and the display objects (for example, graphics) corresponding to the LDEVs belonging to the service tier are displayed. The customer can discriminate appropriate LDEVs from inappropriate LDEVs from a relationship between the positions of the display objects corresponding to the LDEVs and a range occupied by the appropriate range zone 996. Furthermore, as for the inappropriate LDEV (LDEV for which the display object is placed at the position deviated from the appropriate range zone 996), searching the appropriate range zone 996 immediately under or on the display object corresponding to the inappropriate LDEV enables the customer to determine what service tier is appropriate for each service tier. As depicted in FIG. 22, the re-tiering candidate map 999 may display, for each inappropriate LDEV, a proposal of the re-tiering candidate and the re-tiering type of re-tiering to the candidate ("Promotion" meaning re-tiering to the higher service tier or "Demotion" meaning re-tiering to the lower service tier).

The proposal details GUI portion "recommendation" 1820 includes a re-tiering list 2201. The re-tiering list 2201 includes, for the application judged to be inappropriate and selected, information such as a re-tiering type, a re-tiering candidate, a maximum usage rate before re-tiering, a maximum usage rate after re-tiering, a cost before re-tiering, a cost after re-tiering, and a cost difference (a value obtained by subtracting the cost after re-tiering from the cost before re-tiering) per inappropriate LDEV. In other words, the re-tiering list 2201 displays, for the selected and inappropriate application, whether the service tier is made Promotion or Demotion, where is a service tier re-tiering designation, how the maximum IOPS usage rate varies, and how the cost varies per inappropriate LDEV. It is noted that for each inappropriate LDEV, the maximum usage rate before re-tiering, the maximum usage rate after re-tiering, the cost before re-tiering, and the cost after re-tiering are, for example, as follows.

The maximum usage rate before re-tiering means the maximum IOPS usage rate before re-tiering of the LDEV for the service tier from which the LDEV is to be re-tiered.

The maximum usage rate after re-tiering means the maximum IOPS usage rate after re-tiering of the LDEV for the service tier from which the LDEV is to be re-tiered. The maximum IOPS usage rate after re-tiering is a value estimated by the calculation section 261 on the basis of the maximum IOPS of the LDEV.

The cost before re-tiering means the cost before re-tiering of the LDEV for the service tier from which the LDEV is to be re-tiered.

The cost after re-tiering means the cost after re-tiering of the LDEV for the service tier from which the LDEV is to be re-tiered. The cost after re-tiering is a value estimated by the calculation section 261 on the basis of the used capacity of the LDEV and the unit price of the service tier.

Figure 23:
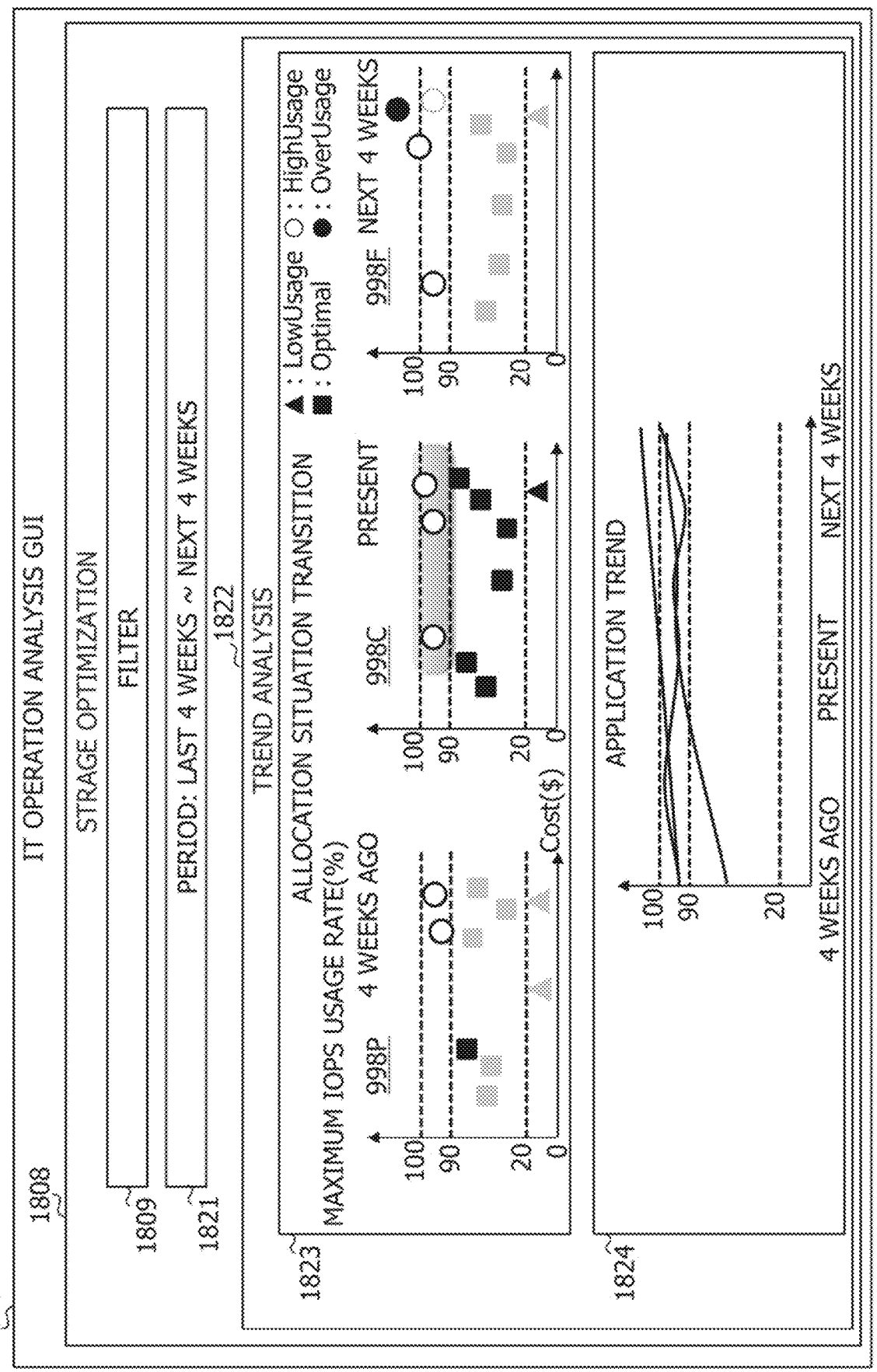
FIG. 23 depicts an example of detailed display of resource performance appropriate/inappropriate judgement GUI according to one modification.

FIG. 23 depicts an example of detailed display of the resource performance appropriate/inappropriate judgement GUI according to one modification.

On the period GUI portion 1821, periods from the past to the future are designated. It is assumed, for example, that last 4 weeks and next 4 weeks are designated.

On the tendency grasping GUI portion "trend analysis" 1822, the allocation situation transition GUI portion 1823 and the application trend GUI portion 1824 are displayed for the designated periods. The tendency grasping GUI portion "trend analysis" 1822 may display, for example, a range of the type of objects to be managed designated by the filter 1809.

On the allocation situation transition GUI portion 1823, a service tier map 998P corresponding to the last 4 weeks (an example of a designated past point in time), a service tier map 998C corresponding to the current time, and a service tier map 998F corresponding to the next 4 weeks (an example of a designated future point in time) are displayed side by side. The customer can thereby take a bird's-eye view of the transition of an appropriate/inappropriate judgement result per service tier corresponding to each of all applications included in the range designated by the filter 1809.

It is noted that in a case in which a partial region is designated from one of the service tier maps 998P, 998C, and 998F, the judgement section 219 highlights the display object corresponding to the same AppTier as the AppTier belonging to the designated region among a plurality of AppTiers for each of the remaining maps. The customer can thereby grasp at which position the service tier corresponding to the application selected from, for example, the service tier map 998C corresponding to the current time is placed in the past and in the future.

The application trend GUI portion 1824 displays, for one or more applications selected from any of the service tier maps 998P, 998C, and 998F (one or more applications included in one or more selected AppTiers), a tendency of a variation in the maximum IOPS usage rate of the service tier corresponding to the selected application from the last 4 weeks to the next 4 weeks.

FIG. 24 is a configuration diagram of the Output Tables 309 for GUI display.

The Output Tables 309 include an appropriate/inappropriate judgement display table 2401 and a proposed candidate display table 2403.

The appropriate/inappropriate judgement display table 2401 includes, for example, per AppTier, information such as a date 2411, an application name 2412, a service tier name 2413, a maximum usage rate 2414, an average usage rate 2415, an appropriate/inappropriate judgement 2416, a total capacity 2417, a total cost 2418, a storage name 2419, a country name 2420, a city name 2421, and a data center name 2422.

The information 2411 to 2413 is the same as the information 1351 to 1353 (or 1361 to 1363) of FIG. 13B. The maximum usage rate 2414 is at least one of the maximum measured usage rate 1354 and the maximum predicted usage rate 1364 of FIG. 13B. The average usage rate 2415 is at least one of the average measured usage rate 1355 and the average predicted usage rate 1365 of FIG. 13B. The information 2417 to 2422 is the same as the information 1313 to 1318 of FIG. 13A.

The service tier map 998 is displayed on the basis of the appropriate/inappropriate judgement display table 2401 (and with reference to the other tables if needed).

The proposed candidate display table 2403 includes, for example, per LDEV, information such as a date 2431, an application name 2432, a service tier name 2433, an LDEV name 2434, a capacity 2435, a cost 2436, a maximum IOPS 2437, an average IOPS 2438, a maximum usage rate 2439, an average usage rate 2440, an appropriate/inappropriate judgement 2441, a re-tiering type 2442, a destination service tier name 2443, an IOPS after re-tiering 2444, a cost after re-tiering 2445, a cost difference 2446, a storage name 2447, a country name 2448, a city name 2449, and a data center name 2450.

The information 2431 to 2434 is the same as the information 1371 to 1374 of FIG. 13B. The information 2435 and 2436 is the same as the information 1325 and 1326 of FIG. 13A. The information 2347 to 2443 is the same as the information 1375 to 1381 of FIG. 13B. The IOPS after re-tiering 2444 is a maximum IOPS (and/or an average IOPS) estimated in a case of assuming that the LDEV is re-tiered to a candidate tier (service tier indicated by the destination service tier name 1381). The cost 2445 after re-tiering is a cost (for example, a product between the unit price of the candidate tier and the used capacity of the LDEV (capacity used by the application indicated by the application name 2432)) estimated in a case of assuming that the LDEV is re-tiered to the candidate tier. The cost difference 2446 is a difference between the cost 2436 and the cost after re-tiering 2445. The information 2447 to 2450 is the same as the information 1382 to 1385 of FIG. 13B.

The re-tiering candidate map 999 and the re-tiering list 2201 are displayed on the basis of the proposed candidate display table 2403 (and with reference to the other tables if needed).

While one embodiment of the present invention has been described, the description is exemplarily given for describing the present invention and does not intend to limit the scope of the present invention only to this embodiment. The present invention can be implemented in various other modes.

What is claimed is:

1. An optimization support system for supporting resource allocation optimization, comprising:
    one or more processors;
    a memory coupled to the one or more processors storing instructions that when executed by the one or more processors, cause the one or more processors to execute:
    a calculation section that calculates a performance ratio and a cost for each of a plurality of service tiers associated with one or a plurality of applications on the basis of management data including data related to usage of each of a plurality of storage resources classified to belong to the plurality of service tiers,
        the performance ratio of each of the service tiers being a ratio of an intended performance to an agreement performance,
        the agreement performance of each of the service tiers being a performance that serves as a reference performance of the service tier,
        the intended performance of each of the service tiers being a performance calculated for the service tier,
        the cost of each of the service tiers being based on a used capacity of an allocated storage resource among the storage resources belonging to the service tier; and
    a judgement section that displays a service tier map that is a map
        that has a first axis corresponding to the performance ratio and a second axis orthogonal to the first axis and corresponding to the cost, and
        on which, for each service tier, a display object is placed at a position according to the calculated performance ratio and the calculated cost of the service tier.

2. The optimization support system according to claim 1, wherein
    for the management data, the usage of each of the plurality of storage resources is usage during a period related to at least one of a past, current time, and a future,
    the performance ratio and the cost calculated for each of the service tiers are at least one of sets (A) and (B):
        (A) an actual performance ratio and an actual cost of each of the service tiers; and
        (B) a predicted performance ratio and a predicted cost of each of the service tiers, and
    for each of the service tiers, the display object is placed at least one of a position according to the set (A) and a position according to the set (B) on the service tier map.

3. The optimization support system according to claim 1, further comprising
    a proposal section that makes a re-tiering proposal that is to propose a service tier candidate as a re-tiering for each of one or more inappropriate storage resources in a case in which the plurality of storage resources include the one or more inappropriate storage resources, wherein
    each of the one or more inappropriate storage resources is a storage resource having a performance deviating from an appropriate performance range of a service tier to which the storage resource belongs, and
    for each of the one or more inappropriate storage resources, the service tier candidate as the re-tiering is at least one service tier having an appropriate performance range overlapped by the performance of the inappropriate storage resource.

4. The optimization support system according to claim 1, wherein
    the plurality of storage resources are allocated to the plurality of applications,
    the management data includes data indicating a relationship among the applications, the storage resources, and the service tiers,
    the calculation section calculates a performance ratio and a cost per AppTier that is a set of an application and a service tier,
        an agreement performance of each AppTier being a performance of the service tier, the performance serving as a reference with respect to the application,
        an intended performance of each AppTier being a performance calculated as a performance of the service tier with respect to the application,
        the cost of each AppTier being based on a used capacity of a corresponding storage resource that is a storage resource allocated to the application among the storage resources belonging to the service tier, the used capacity being an amount by which the application uses the allocated storage resource, and
    the service tier map is a map on which a display object is placed, for each AppTier, at a position according to the calculated performance ratio and the calculated cost of the AppTier.

5. The optimization support system according to claim 4, wherein
    the service tier map is demarcated into an appropriate region that is a region corresponding to an appropriate range of the performance ratio and an inappropriate region that is a region corresponding to an inappropriate range of the performance ratio.

6. The optimization support system according to claim 4, wherein
    a lower limit and an upper limit of an appropriate range of the performance ratio are common to the plurality of service tiers.

7. The optimization support system according to claim 4, wherein
    the agreement performance of each AppTier is a performance according to a performance that serves as a reference per storage resource for the service tier and according to the number of corresponding storage resources,
    the intended performance of each AppTier is a maximum value of a plurality of performances of the service tier calculated for the application and corresponding to a plurality of points in time, and
    each of the plurality of performances of each AppTier is a performance according to a performance of each of the corresponding storage resources.

8. The optimization support system according to claim 4, wherein the judgement section judges top N applications, where N is a natural number, for each of which it is desired to execute an appropriate judgement, on the basis of at least one of the performance ratio and the cost of each of all AppTiers belonging to a designated region on the service tier map, and
the judgement section displays information related to the determined N applications.

9. The optimization support system according to claim 8, wherein
the judgement section displays at least one of a performance details graph and a cost details graph on the basis of the management data for each of M applications, where M is a natural number equal to or smaller than N, among the N applications,
the performance details graph is a graph indicating, for each of the M applications, the performance ratio of the service tier for the application in relation to each AppTier including the application, and
the cost details graph is a graph indicating, for each of the M applications, the cost of the service tier for the application in relation to each AppTier including the application.

10. The optimization support system according to claim 4, wherein
for the management data, the usage of each of the plurality of storage resources is usage during a period related to at least one of a past, current time, and a future,
the performance ratio and the cost calculated for each AppTier are at least one of sets (A) and (B):
(A) an actual performance ratio and an actual cost of each AppTier; and
(B) a predicted performance ratio and a predicted cost of each AppTier, and
for each AppTier, the display object is placed at least one of a position according to the set (A) and a position according to the set (B) on the service tier map.

11. The optimization support system according to claim 4, further comprising
a proposal section that makes a re-tiering proposal that is to propose a service tier candidate as a re-tiering for each of one or more inappropriate storage resources in a case in which the one or more inappropriate storage resources are present for an intended application that is the application included in an AppTier corresponding to a predetermined condition among a plurality of AppTiers, wherein
each of the one or more inappropriate storage resources is a storage resource having a performance deviating from an appropriate performance range of a service tier to which the storage resource belongs, and
for each of the one or more inappropriate storage resources, the service tier candidate as the re-tiering is at least one service tier having an appropriate performance range overlapped by the performance of the inappropriate storage resource.

12. The optimization support system according to claim 11, wherein
the re-tiering proposal is to display a re-tiering candidate map, and
the re-tiering candidate map is a map
that has a first axis corresponding to the service tier and a second axis orthogonal to the first axis and corresponding to the performance,
on which a display object having a length corresponding to the appropriate range of the service tier is placed at a position according to the appropriate range, per service tier included in each AppTier including the intended application as a constituent element, and
on which a display object is placed at a position according to a performance of the inappropriate storage resource and according to the service tier to which the inappropriate storage resource belongs, for each inappropriate storage resource allocated to the intended application.

13. The optimization support system according to claim 12, wherein
in a case in which a non-overlapping range that is a range that does not overlap any of two or more appropriate performance ranges of two or more service tiers configuring, together with the intended application, two or more AppTiers, is present in a coverage of the two or more appropriate ranges of the two or more service tiers, the proposal section makes a correction to lower a minimum value that is closest to a maximum value of the non-overlapping range of any of the appropriate performance ranges until the non-overlapping range is eliminated.

14. An optimization support method for supporting resource allocation optimization, comprising:
calculating a performance ratio and a cost for each of a plurality of service tiers associated with one or a plurality of applications on the basis of management data including data related to usage of each of a plurality of storage resources classified to belong to the plurality of service tiers,
the performance ratio of each of the service tiers being a ratio of an intended performance to an agreement performance,
the agreement performance of each of the service tiers being a performance that serves as a reference performance of the service tier,
the intended performance of each of the service tiers being a performance calculated for the service tier,
the cost of each of the service tiers being based on a used capacity of an allocated storage resource among the storage resources belonging to the service tier; and
displaying a service tier map that is a map
that has a first axis corresponding to the performance ratio and a second axis orthogonal to the first axis and corresponding to the cost, and
on which, for each service tier, a display object is placed at a position according to the calculated performance ratio and the calculated cost of the service tier.

15. A non-transitory computer readable medium storing a computer program for causing a computer to execute:
calculating a performance ratio and a cost for each of a plurality of service tiers associated with one or a plurality of applications on the basis of management data including data related to usage of each of a plurality of storage resources classified to belong to the plurality of service tiers,
the performance ratio of each of the service tiers being a ratio of an intended performance to an agreement performance,
the agreement performance of each of the service tiers being a performance that serves as a reference performance of the service tier,
the intended performance of each of the service tiers being a performance calculated for the service tier, the cost of each of the service tiers being based on a used capacity of an allocated storage resource among the storage resources belonging to the service tier; and displaying a service tier map that is a map that has a first axis corresponding to the performance ratio and a second axis orthogonal to the first axis and corresponding to the cost, and on which, for each service tier, a display object is placed at a position according to the calculated performance ratio and the calculated cost of the service tier.

* * * * *